United States Patent
Han

(10) Patent No.: US 12,444,107 B2
(45) Date of Patent: Oct. 14, 2025

(54) DATA PROCESSING METHOD BASED ON AUGMENTED REALITY

(71) Applicant: Tencent Technology (Shenzhen) Company Limited, Guangdong (CN)

(72) Inventor: Rui Han, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 59 days.

(21) Appl. No.: 18/202,561

(22) Filed: May 26, 2023

(65) Prior Publication Data

US 2023/0298239 A1 Sep. 21, 2023

Related U.S. Application Data

(63) Continuation of application No. PCT/CN2022/112068, filed on Aug. 12, 2022.

(30) Foreign Application Priority Data

Jan. 27, 2022 (CN) .......................... 202210101966.9

(51) Int. Cl.
*G06F 3/01* (2006.01)
*G06F 3/04842* (2022.01)
*G06T 3/20* (2006.01)
*G06T 5/70* (2024.01)
*G06T 7/13* (2017.01)
(Continued)

(52) U.S. Cl.
CPC .......... *G06T 11/60* (2013.01); *G06F 3/04842* (2013.01); *G06T 3/20* (2013.01); *G06T 5/70* (2024.01); *G06T 7/13* (2017.01); *G06T 7/60* (2013.01); *G06T 7/73* (2017.01);
(Continued)

(58) Field of Classification Search
CPC ........ G06F 3/01; G06F 3/04842; G06F 3/017; G06F 3/011; G06T 3/40; G06T 11/60; G06T 7/73; G06T 7/13; G06T 5/70; G06T 3/20; G06T 7/60; G06T 2200/24; G06T 7/20; G06V 20/20; G06V 10/462; G06V 40/28; H04N 5/33; H04N 5/378
See application file for complete search history.

(56) References Cited

U.S. PATENT DOCUMENTS

2014/0361984 A1* 12/2014 Kim ..................... G06F 3/04842
345/156
2019/0237044 A1* 8/2019 Day ......................... G09G 5/08

FOREIGN PATENT DOCUMENTS

CN 106774936 5/2017
CN 112069358 12/2020
(Continued)

OTHER PUBLICATIONS

International Search Report issued Nov. 11, 2022 in International (PCT) Application No. PCT/CN2022/112068.

*Primary Examiner* — Michael A Faragalla
(74) *Attorney, Agent, or Firm* — Crowell & Moring LLP

(57) ABSTRACT

A data processing method based on augmented reality is provided. The method includes: displaying a captured image of a scene in a human-computer interaction interface, the captured image comprising at least one object; identifying a subject object from the at least one object, the subject object being an only object or an object with a largest size in the captured image; and displaying at least one piece of information associated with the subject object in the human-computer interaction interface.

18 Claims, 14 Drawing Sheets

(51) Int. Cl.
*G06T 7/60* (2017.01)
*G06T 7/73* (2017.01)
*G06T 11/60* (2006.01)
*G06V 10/46* (2022.01)
*G06V 20/20* (2022.01)

(52) U.S. Cl.
CPC ............ *G06V 10/462* (2022.01); *G06V 20/20* (2022.01); *G06T 2200/24* (2013.01)

(56) References Cited

FOREIGN PATENT DOCUMENTS

| | | |
|---|---|---|
| CN | 112230765 | 1/2021 |
| CN | 112947756 | 6/2021 |
| WO | WO2022/001593 | 6/2022 |

\* cited by examiner

DATA PROCESSING METHOD BASED ON AUGMENTED REALITY

RELATED APPLICATION

This application is a continuation application of PCT Patent Application No. PCT/CN2022/112068, filed on Aug. 12, 2022, which claims priority to Chinese Patent Application No. 202210101966.9, entitled "IMAGE PROCESSING METHOD AND APPARATUS, DEVICE, READABLE STORAGE MEDIUM, AND PROGRAM PRODUCT" filed with China National Intellectual Property Administration on Jan. 27, 2022, wherein the content of the above-referenced applications is incorporated herein by reference in its entirety.

FIELD OF THE TECHNOLOGY

This disclosure relates to a computer application technology, and in particular, to a data processing method and apparatus, an electronic device, a computer-readable storage medium and a computer program product based on augmented reality.

BACKGROUND OF THE DISCLOSURE

With the development of computer technologies, electronic devices may implement richer and more vivid virtual scenes. The virtual scene refers to a digital scene outlined by a computer through a digital communication technique. A user may have a fully virtualized experience (e.g., virtual reality) or a partially virtualized experience (e.g., augmented reality) in terms of vision, hearing, and the like, in the virtual scene, while interacting with various objects in a shot scene.

However, a display mode of augmented reality is relatively limited. For example, when a captured image of the shot scene is displayed through a human-computer interaction interface of augmented reality, in order to help the user understand the content of the picture and provide reference for human-computer interaction operation in an augmented reality scene, it is necessary to display information synchronized with the picture, for example, a text, in time and accurately.

However, there is a lack of an accurate and efficient solution to understand the picture content to synchronously display associated information in related art.

SUMMARY

An embodiment of this disclosure provides a data processing method and apparatus, an electronic device, a computer-readable storage medium and a computer program product based on augmented reality, which can flexibly and accurately control the display of associated information in an augmented reality scene.

The technical solution of the embodiments of this disclosure is implemented as follows.

An embodiment of this disclosure provides a data processing method based on augmented reality, applied to an electronic device, and comprising:
  displaying a captured image of a scene in a human-computer interaction interface, the captured image comprising at least one object;
  identifying a subject object from the at least one object, the subject object being an only object or an object with a largest size in the captured image; and
  displaying at least one piece of information associated with the subject object in the human-computer interaction interface.

An embodiment of this disclosure provides a data processing method based on augmented reality, applied to an electronic device, and comprising:
  displaying a captured image of a scene in a human-computer interaction interface, the captured image comprising a plurality of objects;
  displaying a selection identifier for each of the plurality of objects;
  determining an object corresponding to a triggered selection identifier as a subject object in response to a triggering operation for the selection identifiers; and
  displaying at least one piece of information associated with the subject object in the human-computer interaction interface.

An embodiment of this disclosure provides an electronic device for data processing, comprising:
  a memory configured to store executable instructions; and
  a processor configured to implement, when executing the executable instructions stored in the memory, the data processing method based on augmented reality provided in the embodiments of this disclosure.

An embodiment of this disclosure provides a computer-readable storage medium storing executable instructions, the executable instructions, when executed by a processor, implementing the data processing method based on augmented reality provided in the embodiments of this disclosure.

An embodiment of this disclosure provides a computer program product, comprising computer programs or instructions, the computer programs or the instructions, when executed by a processor, implementing the data processing method based on augmented reality provided in the embodiments of this disclosure.

The embodiments of this disclosure have the following beneficial effects:

By identifying the subject object in the captured image and displaying the associated information of the subject object in a targeted manner, the accuracy of the associated information is improved by flexibly controlling the display of the associated information by identifying the subject object, and the only object or the object with the largest size is taken as an identification condition, such that the subject object may be locked all the time under the condition that the captured image is constantly changing, thereby displaying the associated information of the subject object accurately and in time, and avoiding the problem of delay and inaccuracy in displaying the associated information caused by manual selection.

DESCRIPTION OF EMBODIMENTS

Figure 1A:
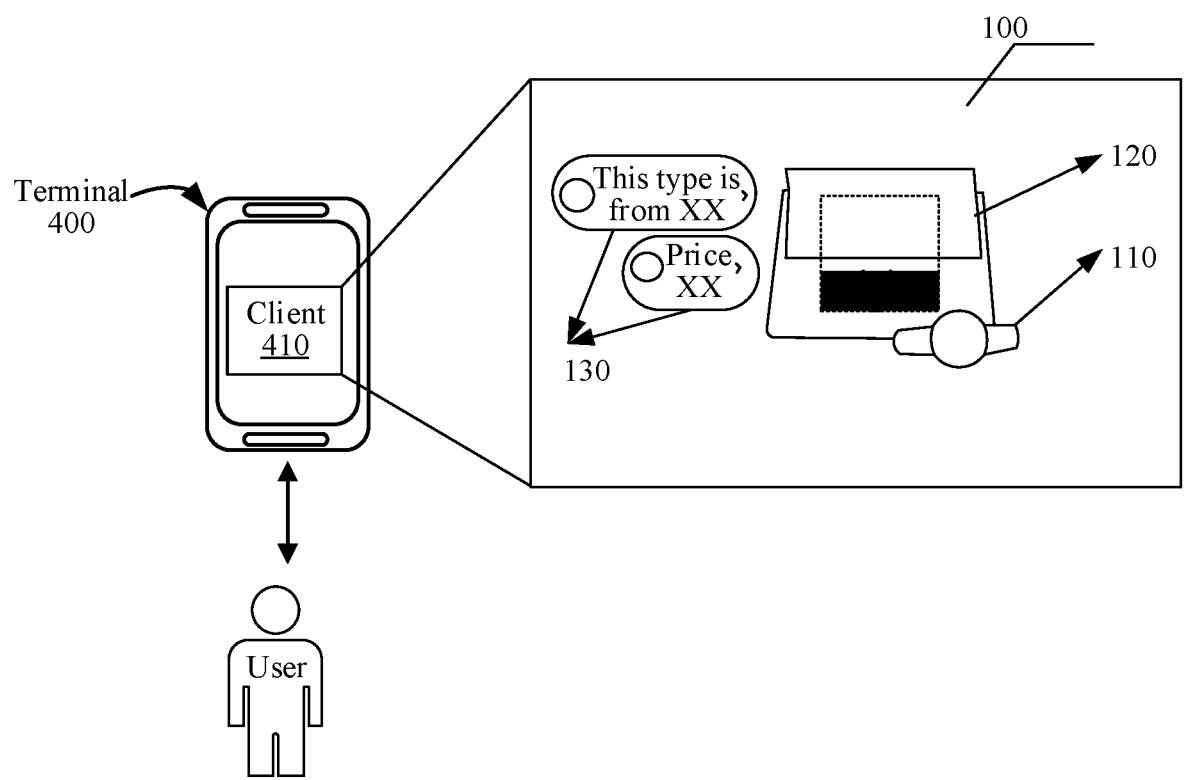
FIG. 1A and FIG. 1B are schematic diagrams of application modes of a data processing method based on augmented reality according to an embodiment of this disclosure.

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art without creative efforts shall fall within the protection scope of this disclosure.

In the following description, the involved term "first\second" is merely intended to distinguish between similar objects rather than represent a specific order for the objects. It may be understood that "first\second" may be interchanged with a specific order or sequence if permitted, so that the embodiments of this disclosure described here may be implemented in other orders besides those illustrated or described here.

Unless otherwise defined, meanings of all technical and scientific terms used in this specification are the same as those usually understood by a person skilled in the art to which this disclosure belongs. The terms used herein are merely intended to describe the objectives of the embodiments of this disclosure, but are not intended to limit this disclosure.

Before the embodiments of this disclosure are further described in detail, a description is made on terms in the embodiments of this disclosure, and the terms in the embodiments of this disclosure are applicable to the following explanations.

1) Virtual scene: a scene outputted by an electronic device that is different from the real world, in which visual perception of the virtual scene may be formed by naked eye or with the assistance of a device, for example, a two-dimensional image outputted by a display screen and a three-dimensional image outputted by stereoscopic display technologies such as stereoscopic projection, virtual reality and augmented reality technologies; in addition, various perceptions simulating the real world, such as an auditory perception, a tactile perception, an olfactory perception and a motion perception, may alternatively be formed through various possible hardware.

2) In response to: being used to indicate a condition or a state on which an executed operation depends, where when the dependent condition or state is met, one or more executed operations may be real-time or with a set delay; unless otherwise specified, there is no limitation to the sequential order of execution of the plurality of executed operations.

3) Client: an application running in a terminal to provide various services, for example, a game client and a short video client.

4) Object: any element in a real scene or in the virtual scene, for example, a real object in the real scene shot by a camera, such as, a passer-by, and a virtual object in the virtual scene shot by the camera (such as a virtual object in a game and a virtual object in a video), the virtual object referring to an avatar of various people and things capable of interacting in the virtual scene, or a movable object in the virtual scene. The movable object may be a virtual character, a virtual animal, an animated character and the like, for example, a character, an animal, a plant, an oil drum, a wall and a stone displayed in a virtual scene. The virtual object may be a virtual avatar for representing a user in the virtual scene. The virtual scene may include a plurality of virtual objects, and each virtual object has its own shape and volume in the virtual scene, and occupies some space in the virtual scene.

5) Associated information: any information related to an object, for example, search information related to the object searched by calling a search engine and recommendation information (e.g., advertisements) for the object, the associated information of the object possibly being text information, or image information, voice information, video information and the like.

6) Augmented Reality (AR): a technology by identifying an object such as an article and a plane in a current shooting environment and superimposing virtual information on the identified object, where the virtual information may be a simple user interface (UI), or additional information, such as search information in search results page of a search engine.

7) Object identification: a basic research in the field of computer vision, with its task to identify what object is in an image and report a position and a direction of this object in the image.

8) Responsive: automatically adopting different layout ways for interface elements in a web page or an application program, including elements such as a font size, a height and a width, according to a size of a screen of an electronic device (such as a mobile phone and a computer).

An embodiment of this disclosure provides a data processing method and apparatus, an electronic device, a computer-readable storage medium and a computer program product based on augmented reality, which can flexibly control the display of associated information in an augmented reality scene. Next, an exemplary application of the electronic device provided in the embodiments of this disclosure is described. The electronic device provided in the embodiments of this disclosure may be implemented as various types of user terminals such as a notebook computer, a tablet computer, a desktop computer, a set-top box, a mobile device (for example, a mobile phone, a portable music player, a personal digital assistant, a special messaging device, a portable game device), and may alternatively be implemented as a server. Next, an exemplary application when the device is implemented as a terminal is described.

In order to make it easier to understand the data processing method based on augmented reality provided in the embodiments of this disclosure, firstly, an exemplary implementation scene of the data processing method based on augmented reality provided in the embodiments of this disclosure is described. The augmented reality display scene (implementable by a virtual scene) may be completely outputted based on the terminal or outputted based on the collaboration between the terminal and the server.

In one implementation scene, with reference to FIG. 1A, FIG. 1A is a schematic diagram of an application mode of a data processing method based on augmented reality according to an embodiment of this disclosure, the data processing method based on augmented reality is suitable for some application modes that can complete the calculation of relevant data of a display scene 100 completely depending on the computing capability of a terminal 400 and complete the output of the augmented reality display scene through the terminal 400 such as a smartphone, a tablet computer and an augmented reality device.

When the visual perception of the augmented reality display scene 100 is formed, the terminal 400 calculates data required for the display through graphics computing hardware, completes the loading, parsing and rendering of the display data, and outputs video frames capable of forming the visual perception of the augmented reality on the graphics output hardware, for example, presenting two-dimensional video frames on a display screen of a smartphone, or projecting video frames implementing a three-dimensional display effect on lenses of augmented reality glasses; in addition, in order to enrich a perception effect, the device may alternatively form one or more of an auditory perception, a tactile perception, a motion perception and a taste perception with different hardware.

As an example, the terminal 400 runs a client 410 with an augmented reality function (for example, a standalone short video application, a livestreaming application, an instant messaging application, a video editing application), and outputs the augmented reality display scene 100 (including a captured image of the shot scene and associated information) in a running process of the client 410, where the captured image of the shot scene includes at least one object 110, the object 110 may be any element in the real scene, such as people and things in the real scene, or any element in the virtual scene, such as a virtual object of a shot game; and the terminal identifies a subject object 120 with a largest size from the at least one object 110, and displays at least one piece of associated information 130 of the subject object 120 in the human-computer interaction interface of the client 410, where the associated information 130 may be search information or recommendation information of the subject object.

For example, a captured image of a shot scene is displayed in a human-computer interaction interface, a subject object is identified from at least one object in the captured image as a "handbag", then at least one piece of associated information of the "handbag", for example, a price of the "handbag" and an applicable crowd, is displayed in the human-computer interaction interface, and when the captured image in the human-computer interaction interface changes, a new subject object is re-identified from the changed captured image as a "watch", then information related to the "watch", for example, a sales volume and heat of the "watch", is displayed in the human-machine interaction interface accurately and in time.

According to the embodiments of this disclosure, by identifying the subject object in the captured image and displaying the associated information of the subject object in a targeted manner, the accuracy of the associated information is improved by flexibly controlling the display of the associated information by identifying the subject object, and the only object or the object with the largest size is taken as an identification condition, such that the subject object may be locked all the time under the condition that the captured image is constantly changing, thereby displaying the associated information of the subject object accurately and in time, and avoiding the problem of delay and inaccuracy in displaying the associated information caused by manual selection. Compared with a solution of displaying the associated information of all objects in the captured image through an extra interface, this embodiment of this disclosure does not need to display the associated information through an extra interface, but directly displays the associated information on the human-computer interaction interface displaying the captured image, so that the display efficiency of the associated information is improved and related communication resources and computing resources for extra display are saved.

Figure 1B:
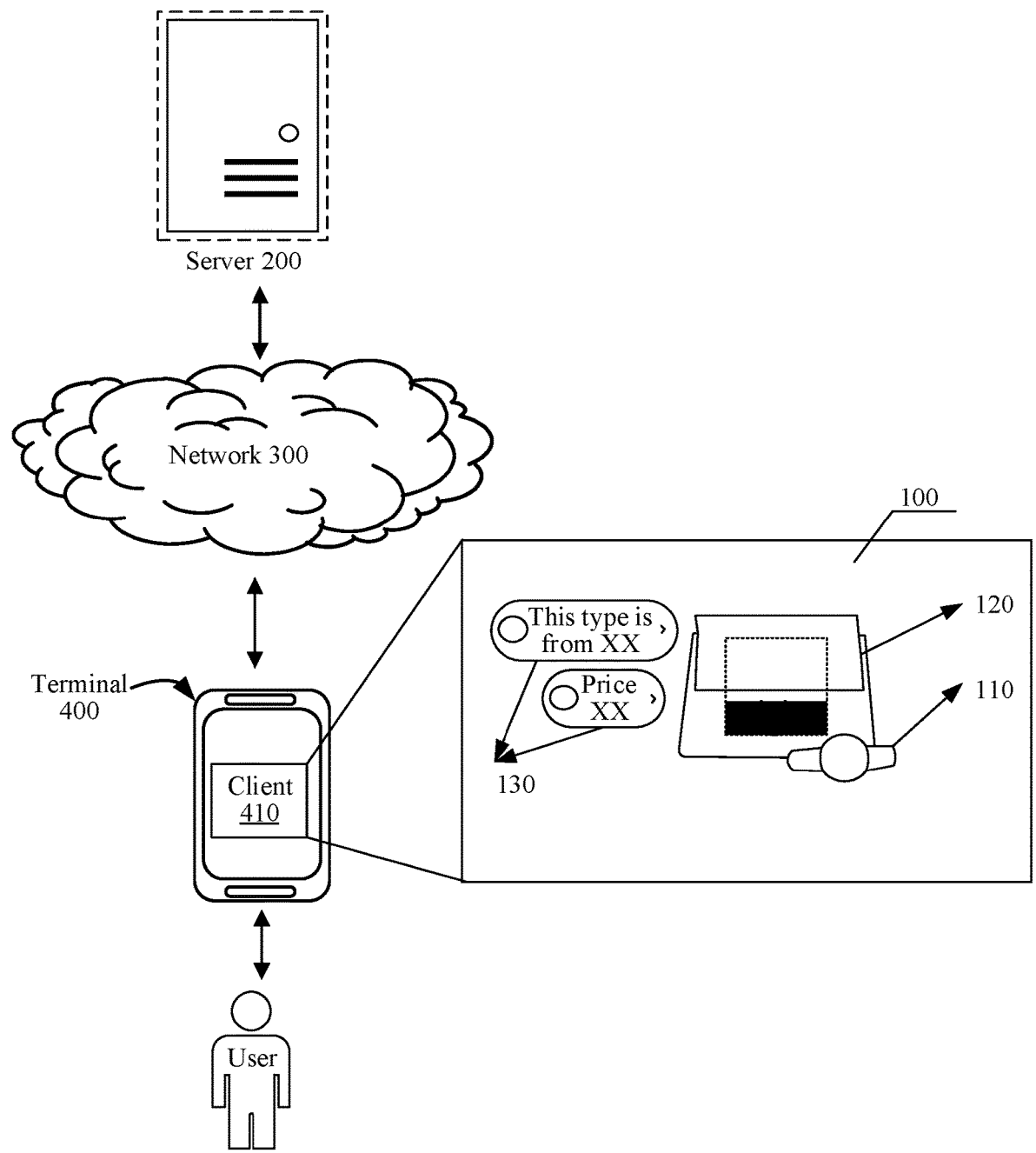

In another implementation scene, with reference to FIG. 1B, FIG. 1B is a schematic diagram of an application mode of a data processing method based on augmented reality according to an embodiment of this disclosure, the application mode is applied to the terminal 400 and the server 200, and the data processing method based on augmented reality is suitable for the application mode that completes the calculation of the augmented reality display scene depending on the computing capability of the server 200 and the output of the augmented reality display scene at the terminal 400.

Taking the forming of the visual perception of the augmented reality display scene 100 as an example, the server 200 calculates the display data related to the augmented reality display scene and sends it to the terminal 400, the terminal 400 completes the loading, parsing and rendering of the calculated display data depending on the graphics computing hardware, and outputs the display scene depending on the graphics computing hardware to form the visual perception, for example, presenting two-dimensional video frames on a display screen of a smartphone, or projecting video frames with a three-dimensional display effect on lenses of augmented reality glasses. With respect to the perception of the form of the augmented reality virtual scene, it may be understood that the perception may be formed by corresponding hardware output of the terminal, for example, the auditory perception is formed using microphone output, and the tactile perception is formed using vibrator output, and so on.

As an example, the terminal 400 runs a client 410 with an augmented reality function (e.g., an online-edition short video application, a livestreaming application, an instant messaging application, a video editing application), and interacts with other users through a connected server (i.e., the server 200); the terminal 400 outputs the augmented reality display scene 100 of the client 410 (including the captured image and associated information obtained through the shot scene), where the captured image of the shot scene includes at least one object 110, the object 110 may be any element in the real scene, such as people and things in the real scene, or any element in the virtual scene, such as a virtual object of a shot game; and the terminal identifies a subject object 120 with a largest size from the at least one object 110, and displays at least one piece of associated information 130 of the subject object 120 in the human-computer interaction interface of the client 410, where the associated information 130 may be search information or recommendation information of the subject object.

In some embodiments, the terminal 400 may implement the data processing method based on augmented reality provided in the embodiments of this disclosure by running a computer program, for example, the computer program may be a native program or a software module in an operating system; the computer program may be a native application (APP), that is, a program that needs to be installed in an operating system to run, such as a short video app (that is, the above-mentioned client 410); the computer program may alternatively be an applet, that is, a program that can run only after being downloaded into a browser environment; and the computer program may alternatively be a short video applet capable of being embedded into any APP. In a word, the computer program described above may be any form of an application program, a module or a plug-in.

This embodiment of this disclosure may be implemented by a cloud technology, the cloud technology referring to a hosting technology that unifies a series of resources such as hardware, software, a network and the like in a wide area network or a local area network to implement data calculation, storage, processing and sharing.

The cloud technology is a general name of a network technology, an information technology, an integration technology, a management platform technology, an application technology and the like based on a cloud computing business model application, can form a resource pool, is used as required, and is flexible and convenient. The cloud computing technology will become an important support. Background services of a technical network system require a large amount of computing and storage resources.

As an example, the server 200 may be an independent physical server, or may be a server cluster or a distributed system including a plurality of physical servers, or may be a cloud server providing basic cloud computing services such as a cloud service, a cloud database, cloud computing, a cloud function, cloud storage, a network service, cloud communication, a middleware service, a domain name service, a security service, CDN, as well as big data and an artificial intelligence platform. The terminal 400 may be a smartphone, a tablet computer, a notebook computer, a desktop computer, a smart speaker, a smartwatch, or the like, but is not limited thereto. The terminal 400 and the server 200 may be directly or indirectly connected by wired or wireless communication, and there is no limitation in this embodiment of this disclosure.

Figure 2:
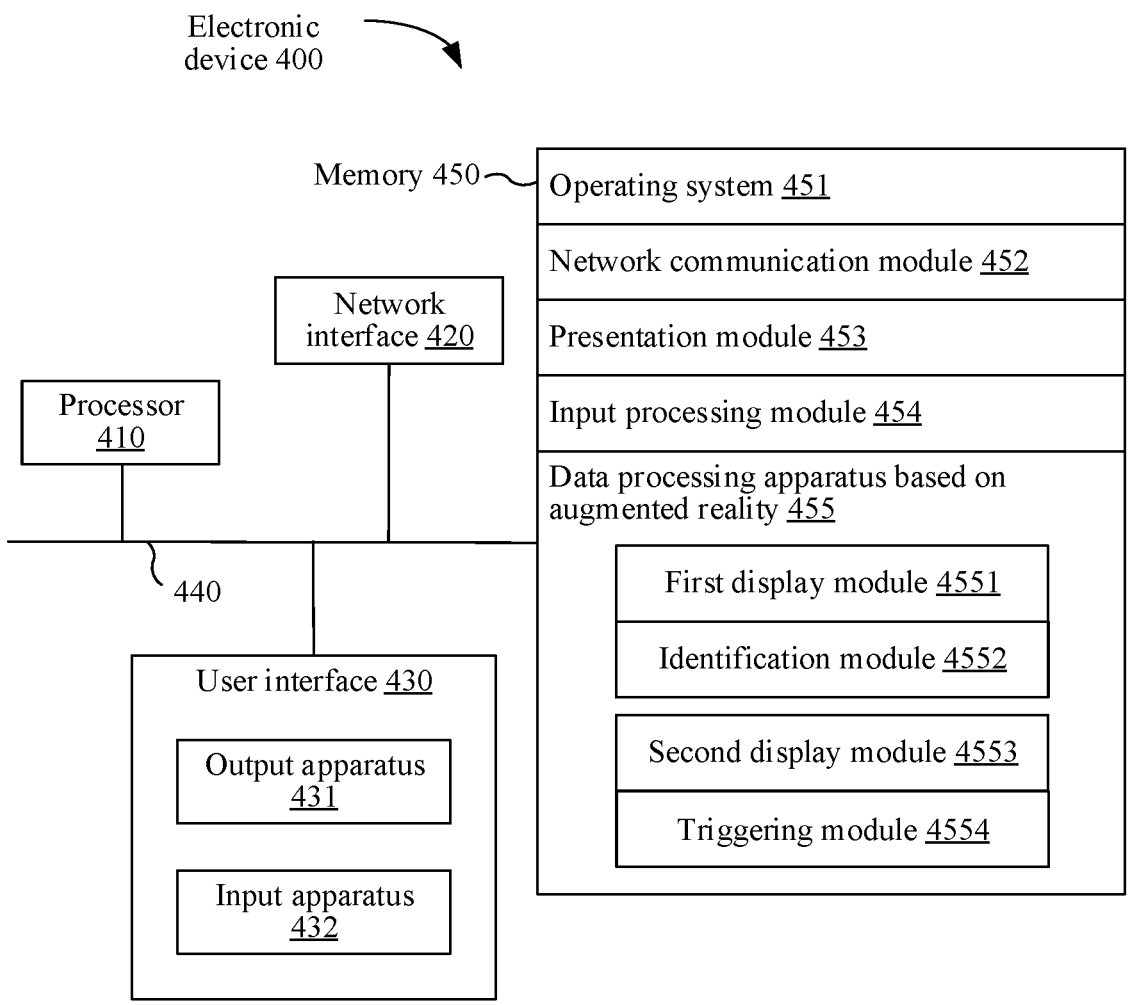
FIG. 2 is a schematic structural diagram of an electronic device for data processing according to an embodiment of this disclosure.

Next, a structure of an electronic device for data processing provided in an embodiment of this disclosure is described. With reference to FIG. 2, FIG. 2 is a schematic structural diagram of an electronic device for data processing according to an embodiment of this disclosure. By taking the electronic device being a terminal as an example, the electronic device shown in FIG. 2 includes: at least one processor 410, a memory 450, at least one network interface 420 and a user interface 430. Various components in the electronic device 400 are coupled together by a bus system 440. It may be understood that, the bus system 440 is configured to implement connection and communication between the components. The bus system 440 includes a power bus, a control bus and a status signal bus in addition to a data bus. However, for clarity of illustration, various buses are labeled as the bus system 440 in FIG. 2.

The processor 410 may be an integrated circuit chip with signal processing capability, such as a general purpose processor, a digital signal processor (DSP), or other programmable logic device, discrete gate or transistor logic device, discrete hardware components, or the like, where the general purpose processor may be a microprocessor or any conventional processor, or the like.

The user interface 430 includes one or more output apparatuses 431 enabling the presentation of a media content, including one or more speakers and/or one or more visual display screens. The user interface 430 further includes one or more input apparatuses 432, including user interface components that facilitate user input, such as a keyboard, a mouse, a microphone, a touchscreen, a camera, other input button and control.

The memory 450 may be removable, non-removable or a combination thereof. An exemplary hardware device includes a solid-state memory, a hard disk drive, an optical disk drive, or the like. The memory 450 includes, for example, one or more storage devices that are physically remote from the processor 410.

The memory 450 includes a transitory memory or a non-transitory memory, and may alternatively include both a transitory memory and a non-transitory memory. The non-transitory memory may be a read only memory (ROM) and the transitory memory may be a random access memory (RAM). The memory 450 described in this embodiment of this disclosure is intended to include any suitable type of memory.

In some embodiments, the memory 450 can store data to support various operations, and examples of such data include programs, modules and data structures or subsets or supersets thereof, as exemplified below.

An operating system 451, including system programs for processing various basic system services and executing hardware-related tasks, for example, a framework layer, a core library layer and a driver layer, used for implementing various basic services and processing tasks based on hardware.

A network communication module 452, being configured to reach other computing devices via one or more (wired or wireless) network interfaces 420, an exemplary network interface 420 including Bluetooth, wireless fidelity (Wi-Fi), a universal serial bus (USB) and the like.

A presentation module 453, being configured to enable the presentation of information via one or more output apparatuses 431 (for example, a display screen and a speaker) associated with the user interface 430 (for example, a user interface for operating a peripheral device and displaying a content and information).

An input processing module 454, being configured to detect one or more user inputs or interactions from one of the one or more input apparatuses 432 and translate the detected inputs or interactions.

In some embodiments, the data processing apparatus based on augmented reality provided in the embodiments of this disclosure may be implemented by software. FIG. 2 shows a data processing apparatus based on augmented reality 455 stored in the memory 450, which may be software in the form of a program and a plug-in, including the following software modules: a first display module 4551, an identification module 4552, or a second display module 4553 and a trigger module 4554; all these modules are logical, so that they may be arbitrarily combined or further split according to implemented functions, and the functions of the various modules will be described below.

Here, the term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

Figure 3A:
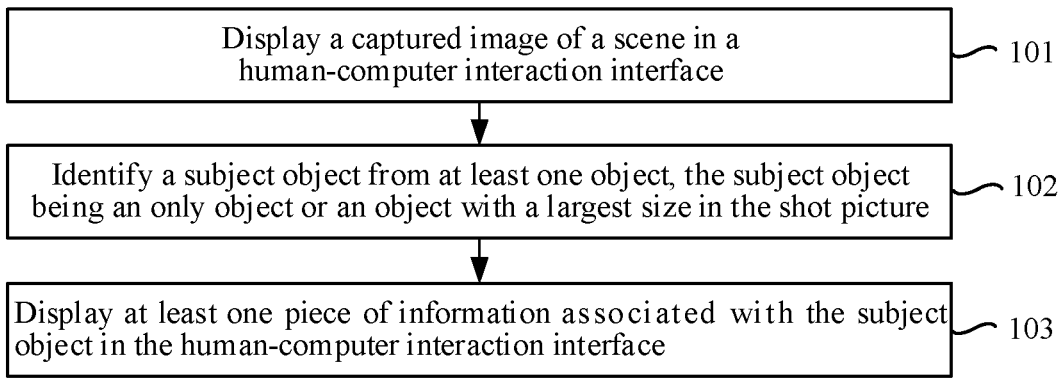
FIG. 3A and FIG. 3B are flowcharts of data processing methods based on augmented reality according to an embodiment of this disclosure.

As mentioned above, the data processing method based on augmented reality provided in the embodiments of this disclosure may be implemented by various types of electronic devices. With reference to FIG. 3A, FIG. 3A is a flowchart of a data processing method based on augmented reality according to an embodiment of this disclosure, and description is made in combination with steps shown in FIG. 3A.

It is to be explained that, the method shown in FIG. 3A may be executed by various forms of computer programs run by the terminal 400, and is not limited to the above-mentioned client 410, for example, the above-mentioned operating system 451, software modules, scripts and applets. Therefore, the following example of the client is not regarded as the limitation of this embodiment of this disclosure.

In step 101, display a captured image of a shot scene in a human-computer interaction interface, the captured image comprising at least one object.

Figure 9:
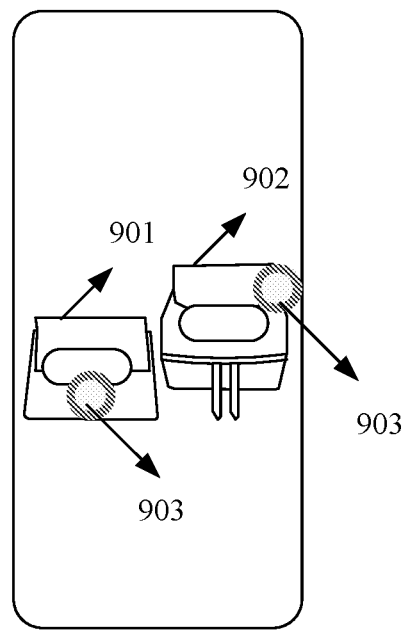
FIG. 9 is a schematic diagram of a plurality of candidate subject objects according to an embodiment of this disclosure.

For example, indoor and outdoor environments are shot by the camera of the terminal, so as to display captured images of a shot video in the human-computer interaction interface, the captured images being an image stream that is dynamically updated in a shooting process. As shown in FIG. 9, the captured image includes at least one object, namely, an object 901 and an object 902.

In some embodiments, the captured image is denoised to obtain a denoised captured image; and edge detection processing is performed on the denoised captured image to obtain an identification result of the at least one object in the captured image.

Figure 7:
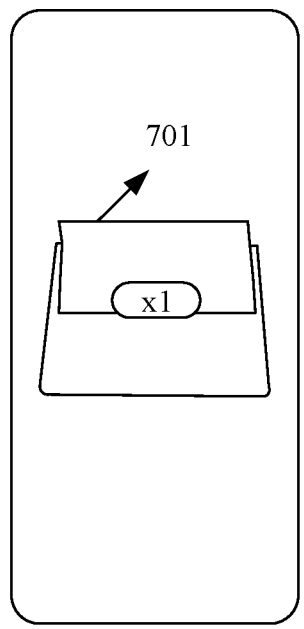
FIG. 7 is a schematic diagram of object identification according to an embodiment of this disclosure.

For example, after the captured image is acquired by the camera of the terminal, the following object identification processing is performed on the captured image. Firstly, the captured image is denoised by a median blur algorithm, while the contrast of the image may be improved to clearly show edge details. After median blur, a gradient and a direction of each pixel point in the captured image are determined using a canny algorithm, and whether the pixel point is a point on an edge (that is, whether the pixel point is located on the edge) is determined through the gradient and the direction of the pixel point (that is, edge detection processing is performed on the denoised captured image), identified points on the edge are set as a data set {x1}, and an area and a position of the data set {x1} are calculated, so that the object in the captured image is determined through the area and the position of the data set {x1}, as shown in FIG. 7, the object 701 being identified by the method above.

In step 102, identify a subject object from the at least one object, the subject object being an only object or an object with a largest size in the captured image.

For example, when it is identified that there is merely an only object in the captured image by the object identification processing, the only object is taken as the subject object; and when it is identified that there are a plurality of objects in the captured image by the object identification processing, the object with the largest size is taken as the subject object, so that intelligent identification of the subject object in the captured image is implemented to display associated information of the subject object in a targeted manner, and the accuracy of the associated information is improved by identifying the subject object to flexibly control the display of the associated information.

It is to be explained that, according to this embodiment of this disclosure, the subject object may be identified from at least one object through an artificial intelligence technology, for example, the subject object may be identified from at least one object through a neural network model for subject object identification, where the neural network model for the subject object identification is obtained by training annotated data of a plurality of historical objects and a historical subject object comprised in a historical image; this embodiment of this disclosure is not limited to the structural form of the neural network model for the subject object identification, for example, the neural network model for the subject object identification may be a convolutional neural network model, a recurrent neural network model and a deep neural network model. According to this embodiment of this disclosure, the subject object may also be identified from at least one object through a classic image identification algorithm, for example, the classic image identification algorithm may be a depth-first search algorithm, a breadth-first search algorithm, an A* search algorithm, and the like.

It is to be explained that, parameters of sizes include at least one of the following: a width and a height; a diagonal length; and an area. For example, for an object with a regular shape, the size of the object is determined with the parameters of the width and the height, or with the parameter of the area; and for an object with an irregular shape, the size of the object is determined with the parameter of the area.

In some embodiments, when the captured image comprises a plurality of objects, the identifying a subject object from the at least one object comprises: determining a first object with a largest size and a second object with a size second only to the first object among the plurality of objects; and determining the first object as the subject object when a size difference between the first object and the second object is greater than a size difference threshold, where the size difference threshold is the product of an area of the human-computer interaction interface and a preset proportion.

In order to identify the subject object more accurately, the size difference between the objects may be considered, then the subject object with the largest size is accurately determined when the size difference between the objects is greater than the size difference threshold, so that the distinction between the subject object and other objects is thus widened and the accuracy of subject object identification is improved.

Figure 8:
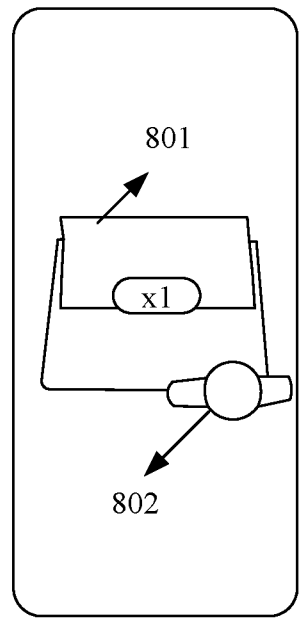
FIG. 8 is a schematic diagram of subject object identification according to an embodiment of this disclosure.

For example, the first object with the largest size is determined as the subject object in the image when the size difference between the first object with the largest size and the second object with the size second only to the first object is greater than the size difference threshold (for example, the size difference threshold is the product of the area of the human-computer interaction interface and the preset proportion (10%)). As shown in FIG. 8, an object 801 and an object 802 are identified by the object identification method above, and since the size difference between the object 801 and the object 802 is greater than 10% of a screen area, the object 801 is determined as the subject object in the captured image.

In some embodiments, types of the sizes of the objects include one of the following: an imaging size and an actual size, where the imaging size represents a size of an unmasked portion of the object in the human-computer interaction interface, and the actual size represents a sum of the size of the unmasked portion and a size of a masked portion of the object in the human-computer interaction interface.

Figure 10:
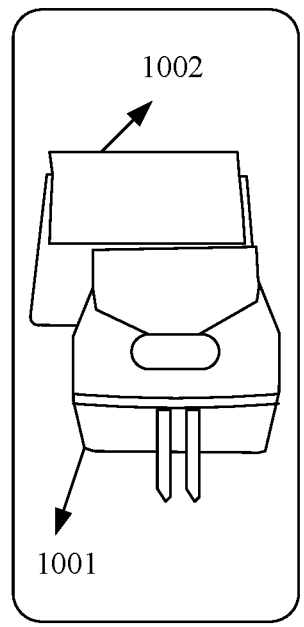
FIG. 10 is a schematic diagram of subject object identification according to an embodiment of this disclosure.

For example, in order to identify the subject object more quickly, only the size of the unmasked portion of the object in the human-computer interaction interface may be considered, so that the size of the object can be quickly determined without considering the size of the masked portion, and an identification rate of the subject object can be increased. As shown in FIG. 10, the object 1001 and the object 1002 are identified by the object identification method above, and since the object 1002 has a portion masked by the object 1001, the size of the object 1002 is the size of the unmasked portion in the human-computer interaction interface.

In order to identify the subject object more accurately, the actual size of the object may be considered, then when the object has a masked portion, the masked portion may be recovered through the unmasked portion of the object in the human-computer interaction interface, so that the actual size of the object may be determined by combining the sum of the size of the unmasked portion and the size of the masked portion of the object in the human-computer interaction interface. As shown in FIG. 10, the object 1001 and the object 1002 are identified by the object identification method above, and since the object 1002 has a portion masked by the object 1001, the size of the object 1002 is the sum of the size of the unmasked portion and the size of the masked portion in the human-computer interaction interface.

In some embodiments, the determining the first object as the subject object when a size difference between the first object and the second object is greater than a size difference threshold comprises: determining the first object as the subject object when the size difference between the first object and the second object is greater than the size difference threshold and the first object is located in a central region of the human-computer interaction interface.

It is to be explained that, the central region is a region including a geometric center, for example, the central region is a circle including the geometric center of the human-computer interaction interface and a rectangle including the geometric center of the human-computer interaction interface.

Figure 4A:
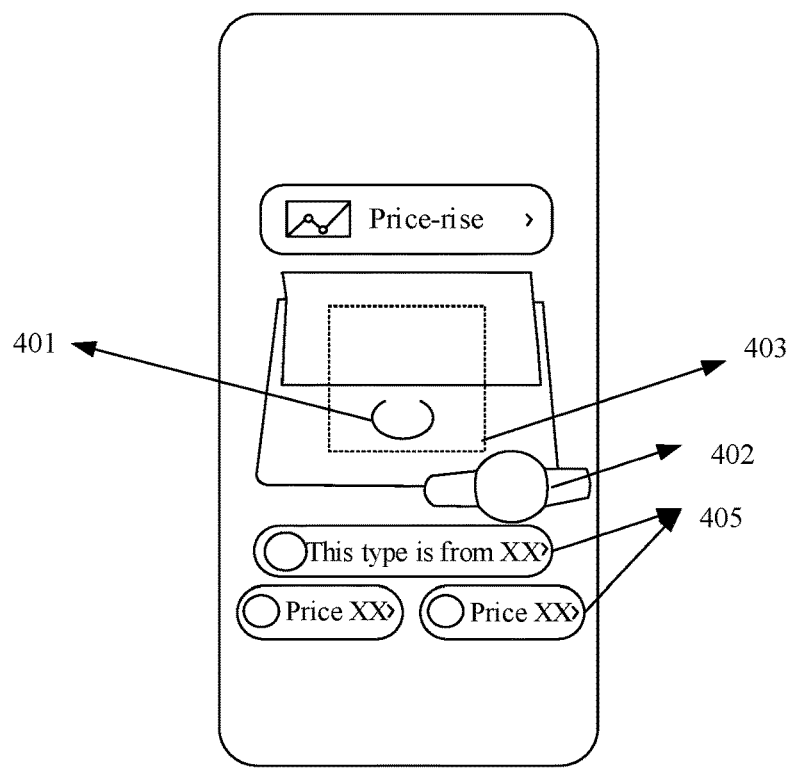
FIG. 4A and FIG. 4B are schematic diagrams of subject object identification according to an embodiment of this disclosure.

As shown in FIG. 4A, the first object 401 is determined as the subject object when the size difference between the first object 401 and the second object 402 is greater than the size difference threshold (for example, greater than 10% of the screen area) and the first object 401 is located in the central region 403 of the human-computer interaction interface, thereby accurately identifying the subject object in combination with the size and an imaging position of the object.

In some embodiments, descending sorting processing is performed on the objects, except the first object, among the plurality of objects based on the sizes of the plurality of objects, when the size difference between the first object and the second object is greater than the size difference threshold and a center of an imaging position of the first object is not located in the central region of the human-computer interaction interface; and an object being the first to meet the following conditions in a descending sorting result is taken as the subject object: the size difference between the object and the object with the size second only to the object is greater than the size difference threshold; and the center of the imaging position of the object is located in the central region of the human-computer interaction interface.

In order to identify the subject object more accurately, the appropriate subject object may be accurately determined in combination with the size and the imaging position of the object (that is, when the size difference between the object and the object with the size second only to the object is greater than the size difference threshold and the center of the imaging position of the object is located in the central region of the human-computer interaction interface).

Figure 4B:
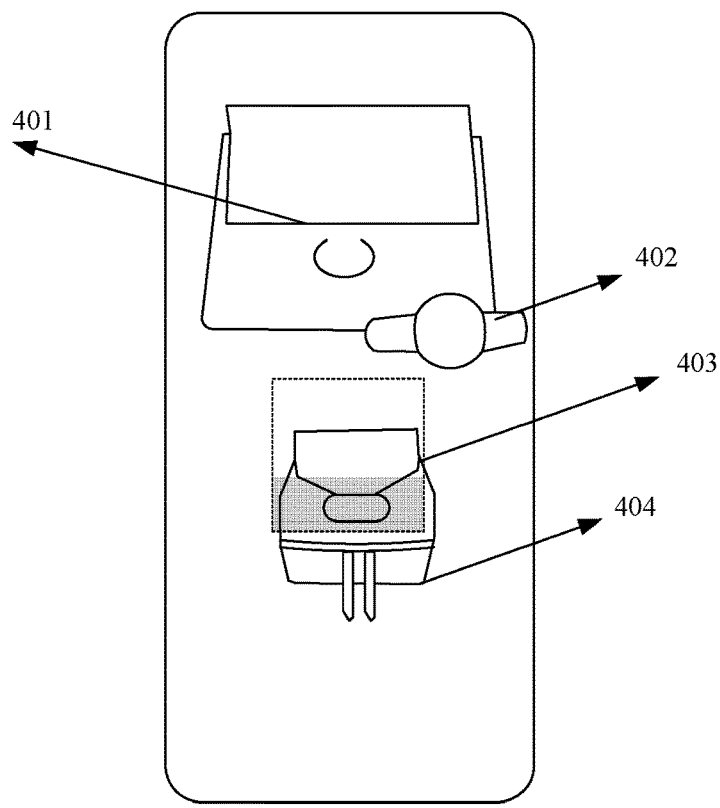

As shown in FIG. 4B, a size difference between the second object 404 and a third object 402 (with the size second only to the second object) is determined when the size difference between the first object 401 (with the largest size) and the second object 404 (with the size second only to the first object) is greater than the size difference threshold (for example, greater than 10% of the screen area) and the first object 401 is not located in the central region 403 of the human-computer interaction interface; and the second object 404 is determined as the subject object when the size difference between the second object 404 and the third object 402 (with the size second only to the second object) is greater than the size difference threshold and the second object 404 is not located in the central region 403 of the human-computer interaction interface.

It is to be explained that, a method for determining a first subject object in the descending sorting result includes: a $j^{th}$ object is determined as the subject object when a size difference between the $j^{th}$ object and a $(j+1)^{th}$ object in the descending sorting result is greater than the size difference threshold and a center of an imaging position of the $j^{th}$ object is located in the central region of the human-computer interaction interface, where j is an incremental natural number and a value range is $1<j<N$, N is the number of objects in the captured image, and N is a positive integer greater than 1.

It is to be explained that, according to an embodiment of this disclosure, an object being the first to meet the following condition in the descending sorting result may also be taken as the subject object: the size difference between the object and the object with the size second only to the object is greater than the size difference threshold.

In some embodiments, a salience of each object is determined based on the size and the imaging position of each object when the size difference between the first object and the second object is greater than the size difference threshold and the first object is not located in the central region of the human-computer interaction interface; and an object with a highest salience is determined as the subject object.

The salience is an important visual feature in the image, which reflects a user's attention degree and interesting degree of the object in the image. The salience represents the importance of the object in the image. When the salience of the object is higher, it indicates that the object is more salient in the image and more attractive to the user's attention, and the probability that the object is identified as the subject object is higher.

For example, when the size difference between the first object and the second object is greater than the size difference threshold and the first object is not located in the central region of the human-computer interaction interface, it indicates that the object with the largest size is biased and may not be the subject object, so that it is necessary to comprehensively consider the size and the imaging position of the object to determine the appropriate subject object from the plurality of objects. For example, the size and the imaging position of the object are mapped by a mapping function to obtain the salience of the object, so that the object with the highest salience is determined as the subject object. For example, the size and the imaging position of the object is mapped by a salience prediction model to obtain the salience of the object, where the salience prediction model is obtained by training annotated data of the sizes, historical imaging positions and historical saliences of a plurality of historical objects included in a historical image. This embodiment of this disclosure is not limited to the structural form of the salience prediction model, for example, the salience prediction model may be a neural network model such as a convolutional neural network model, a recurrent neural network model and a deep neural network model.

In some embodiments, when the captured image comprises a plurality of objects, descending sorting processing is performed on the plurality of objects based on the sizes of the plurality of objects; when the size difference between any two adjacent objects in the descending sorting result is less than or equal to the size difference threshold, selection identifiers are displayed for the any two adjacent objects, where the size difference threshold is the product of an area of the human-computer interaction interface and a preset proportion; and an object corresponding to a triggered selection identifier is determined as a subject object in response to a triggering operation for the selection identifiers.

It is to be explained that, when the size difference between adjacent objects is less than or equal to the size difference threshold, it indicates that there is little difference in the size of the human-computer interaction interface, then the subject object may be selected from the objects with little size difference through manual selection operation of the user, so that the user can quickly select the subject object from a small number of objects to quickly determine the subject object.

For example, descending sorting processing is performed on a plurality of objects according to the sizes of the plurality of objects, and when the size difference between the first object with the largest size and the second object (with the size second only to the first object) is less than or equal to the size difference threshold, the first object and the second object are determined as candidate subject objects, for example, descending sorting processing is performed a plurality of objects according to the sizes of the plurality of objects to determine an $i^{th}$ object among the plurality of objects; when the size difference between the $i^{th}$ object and the $(i+1)^{th}$ object is less than or equal to the size difference threshold, the $i^{th}$ object and the $(i+1)^{th}$ object are determined as candidate subject objects, where, i is an increasing natural number and the value range is 0<i<M, M is the number of objects in the captured image, and M is a positive integer greater than or equal to 2; and selection identifiers are displayed for the candidate subject object, and an object corresponding to a triggered selection identifier is determined as a subject object in response to a triggering operation for the selection identifiers. It is to be explained that, after the candidate subject objects are determined, display modes of a plurality of candidate subject objects are set to pointing modes, where the pointing mode is used to indicate that the candidate subject object displayed in the human-computer interaction interface is selectable, and the pointing mode of the candidate subject object may be implemented by displaying the selection identifier or by selecting a prompt text message.

As shown in FIG. 9, if the object 901 and the object 902 are candidate subject objects, clickable buttons 903 (i.e., selection identifiers) are displayed on the object 901 and the object 902.

In some embodiments, when the captured image comprises a plurality of objects, descending sorting processing is performed on the plurality of objects based on the sizes of the plurality of objects; when the size difference between any two adjacent objects in the descending sorting result is less than or equal to the size difference threshold, an object preference model is called based on the plurality of objects to perform object preference prediction, to obtain the subject object among the plurality of objects, where the size difference threshold is the product of an area of the human-computer interaction interface and a preset proportion, and the object preference model is obtained by training annotated data of a plurality of historical objects and a historical subject object comprised in a historical image.

For example, when the size difference between the first object with the largest size and the second object (with the size second only to the first object) is less than or equal to the size difference threshold, it indicates that the object with the largest size may not be the subject object, and the object preference model is called to perform object preference prediction on the plurality of objects to obtain the subject object among the plurality of objects. Before the object preference model is applied, the object preference model is trained with the annotated data of the plurality of historical objects and the historical subject object included in the historical image, and the trained object preference model is obtained for object preference prediction, so that the subject object in the captured image is automatically identified in combination with preference prediction to improve the accuracy of the subject object.

It is to be explained that, the object preference model is configured to perform object preference prediction on objects, get preference scores of the objects, and take an object with the highest preference score as a subject object, where the preference score represents the user's preference degree for the object, the higher the preference score of the object is, the more the user likes the object, for example, when the first object in the captured image is a crossbody bag and the second object is a backpack and a size difference between the crossbody bag and the backpack is less than or equal to a size difference threshold, it indicates that there is little difference between the sizes of the crossbody bag and the backpack, and the object preference prediction may be performed on the crossbody bag and the backpack by the object preference model respectively, to obtain a preference score of the crossbody bag of 0.8 and a preference score of the backpack of 0.5, showing that the user prefers the crossbody bag and the crossbody bag is taken as the subject object in the captured image. The object preference model may be various neural network models, for example, a convolutional neural network model, a recurrent neural network model and a deep neural network model.

In step 103, display at least one piece of associated information of the subject object in the human-computer interaction interface.

For example, the associated information is any information related to the subject object, for example, search information for the subject object, recommendation information (e.g., advertisements) for the subject object, the associated information of the subject object possibly being text information, or image information, voice information, video information and the like. As shown in FIG. 4A, at least one piece of associated information 405 (i.e., search information for the subject object) of the subject object 401 is displayed in the human-computer interaction interface. It is to be explained that, according to this embodiment of this disclosure, partial information of one piece of associated information may be displayed through a virtual card, and all information of the associated information may be viewed by clicking the virtual card.

It is to be explained that, the virtual card is a card simulating a style of a real card, and used to occupy a part of a region in the human-computer interaction interface to carry the associated information of the subject object, so that the associated information of the subject object is prevented from being mixed together and the associated information of the subject object is displayed more clearly.

Figure 3B:
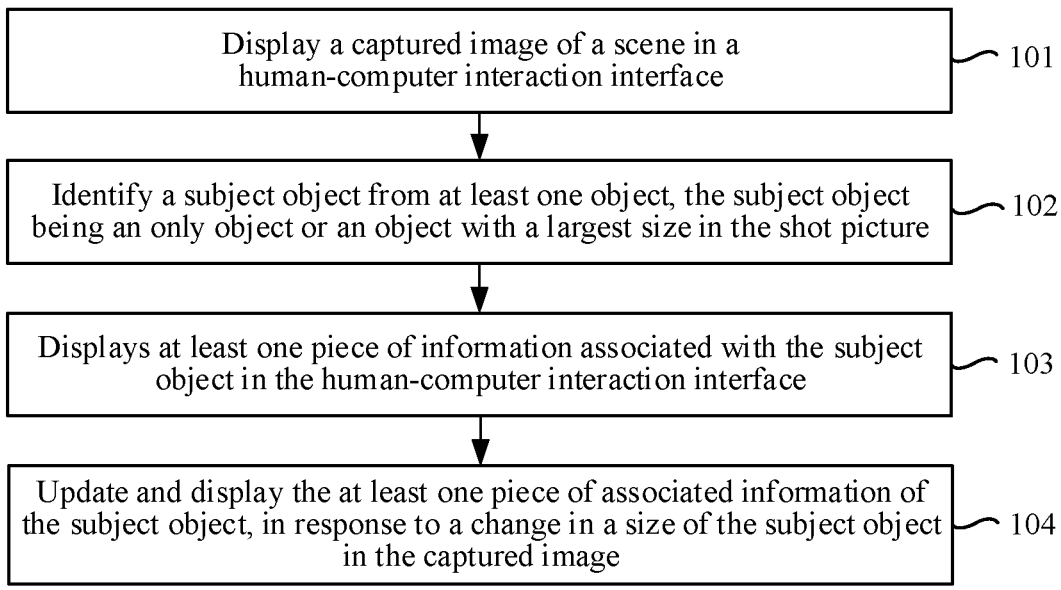

With reference to FIG. 3B, FIG. 3B is one exemplary flowchart of a data processing method based on augmented reality according to an embodiment of this disclosure, and FIG. 3B shows that FIG. 3A further includes step 104. In step 104, update and display at least one piece of associated information of the subject object in response to a change in the size of the subject object in the captured image.

For example, if the user adjusts a distance between the camera of the terminal and the subject object, it means that an intention of the user changes and the size of the subject object in the captured image changes, so that the at least one piece of associated information of the subject object is updated and displayed based on a changed size of the subject object, and the associated information is updated based on a real intention of the user, thereby improving the display effect of augmented reality and the accuracy of the associated information.

In some embodiments, the displaying at least one piece of associated information of the subject object in the human-computer interaction interface comprises: displaying at least one virtual card of the subject object in the human-computer interaction interface, each virtual card comprising one piece of associated information; and the updating and displaying at least one piece of associated information of the subject object based on the subject object with a changed size comprises: synchronously scaling a size of the virtual card based on a scaling ratio of the size of the subject object.

For example, the associated information of the subject object is displayed through the virtual card, and a size of the virtual card is scaled synchronously according to a scaling ratio of the size of the subject object, to enable the virtual card to adapt to the size of the subject object in real time, so that the associated information is clearly viewed.

In some embodiments, before the size of the virtual card is scaled synchronously, conditions for synchronous scaling may alternatively be set as follows: the scaled size of the subject object in the captured image is greater than a first size threshold and less than a second size threshold, and a center of an imaging position of the subject object with the scaled size is located in the central region of the human-computer interaction interface; and an operation of synchronously scaling the size of the virtual card is determined to be executed only when the scaled size of the subject object in the captured image is greater than the first size threshold and less than the second size threshold and the center of the imaging position of the subject object with the scaled size is located in the central region of the human-computer interaction interface, where the first size threshold is less than the second size threshold.

Figure 4C:
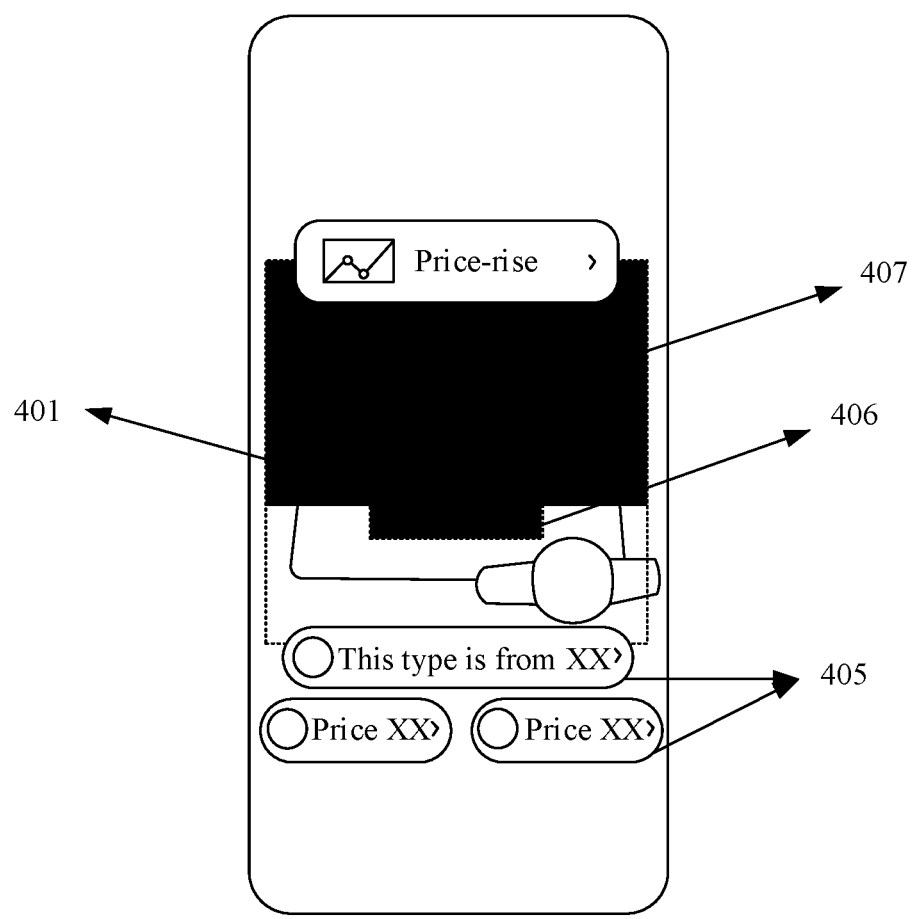
FIG. 4C is a schematic diagram of a bounding frame according to an embodiment of this disclosure.

For example, a first bounding box corresponding to the first size threshold and the central region may be determined in combination with the first size threshold and the central region, a second bounding box corresponding to the second size threshold and the central region may be determined in combination with the second size threshold and the central region, after at least one piece of associated information of the subject object is displayed in the human-computer interaction interface, the first bounding box and the second bounding box are displayed in the human-computer interaction interface, and the user may accurately adjust the distance between the camera of the terminal and the subject object through the first bounding box and the second bounding box to accurately control the size of the subject object in the captured image, thereby achieving the user intention. As shown in FIG. 4C, after at least one piece of associated information 405 of the subject object 401 is displayed in the human-computer interaction interface, a first bounding box 406 and a second bounding box 407 are displayed in the human-computer interaction interface.

It is to be explained that, the subject object in the first bounding box meets the following conditions: the size of the subject object is less than or equal to the first size threshold and the center of the imaging position of the subject object is located in the central region of the human-computer interaction interface; and the subject object in the second bounding box meets the following conditions: the size of the subject object is less than the second size threshold and the center of the imaging position of the subject object is located in the central region of the human-computer interaction interface.

The size of the virtual card is scaled synchronously according to the scaling ratio of the subject object only when the scaled size of the subject object in the captured image is greater than the first size threshold and less than the second size threshold and the center of the imaging position of the subject object with the scaled size is located in the central region of the human-computer interaction interface (that is, the subject object with a changed size is beyond the first bounding box and is within the second bounding box).

It is to be explained that, before the size of the virtual card is scaled synchronously, size conditions for synchronous scaling may alternatively be set as follows: the scaled size of the subject object in the captured image is greater than the first size threshold and less than the second size threshold; and an operation of synchronously scaling the size of the virtual card is determined to be executed only when the scaled size of the subject object in the captured image is greater than the first size threshold and less than the second size threshold.

In some embodiments, when the scaled size of the subject object in the captured image is greater than or equal to the second size threshold and the center of the imaging position of the subject object with the scaled size is located in a preset region of the human-computer interaction interface, contents of the associated information displayed in the virtual card are reduced, and a new virtual card of the subject object is displayed in the human-computer interaction interface, each new virtual card comprising one piece of associated information of the subject object.

It is to be explained that, the form of reducing the contents of the associated information displayed in the virtual card may be to display some content, but not all contents of the associated information, for example, all contents of the associated information are "the price of the bag is xxx, the sales volume is the first" and some content is "xxx, the sales volume is the first"; all contents of the associated information are the text content "the price of the bag is xxx, the sales volume is the first" and a picture, and some content is the text content "the price of the bag is xxx, the sales volume is the first".

For example, a first bounding box corresponding to the first size threshold and the central region may be determined in combination with the first size threshold and the central region, a second bounding box corresponding to the second size threshold and the central region may be determined in combination with the second size threshold and the central region, after at least one piece of associated information of the subject object is displayed in the human-computer interaction interface, the first bounding box and the second bounding box are displayed in the human-computer interaction interface, and the user may accurately adjust the distance between the camera of the terminal and the subject object through the first bounding box and the second bounding box to accurately control the size of the subject object in the captured image, thereby achieving the user intention. As shown in FIG. 4C, after at least one piece of associated information 405 of the subject object 401 is displayed in the human-computer interaction interface, a first bounding box 406 and a second bounding box 407 are displayed in the human-computer interaction interface.

When the scaled size of the subject object in the captured image is greater than or equal to the second size threshold and the center of the imaging position of the subject object with the scaled size is located in the preset region of the human-computer interaction interface (that is, the subject object with a changed size is beyond the second bounding box), it indicates that the user zooms in the camera and wants to see details of the subject object, and the previously recommended card is inaccurate, so that it is necessary to update the display mode of the card to an ellipsis mode (that is, to reduce the content of the associated information displayed in the virtual card), and meanwhile, more new virtual cards in the ellipsis mode may be displayed according to the occupation of the area.

It is to be explained that, according to this embodiment of this disclosure, when the scaled size of the subject object in the captured image is greater than or equal to the second size threshold, the contents of the associated information displayed in the virtual card may also be reduced, and new virtual cards of the subject object are displayed in the human-computer interaction interface, each new virtual card comprising one piece of associated information of the subject object.

In some embodiments, when the scaled size of the subject object in the captured image is less than or equal to the first size threshold and the center of the imaging position of the subject object with the scaled size is located in the central region of the human-computer interaction interface, a new subject object is re-identified from at least one object included in the captured image, and at least one piece of associated information of the new subject object is displayed in the human-computer interaction interface.

For example, a first bounding box corresponding to the first size threshold and the central region may be determined in combination with the first size threshold and the central region, a second bounding box corresponding to the second size threshold and the central region may be determined in combination with the second size threshold and the central region, after at least one piece of associated information of the subject object is displayed in the human-computer interaction interface, the first bounding box and the second bounding box are displayed in the human-computer interaction interface, and the user may accurately adjust the distance between the camera of the terminal and the subject object through the first bounding box and the second bounding box to accurately control the size of the subject object in the captured image, thereby achieving the user intention. As shown in FIG. 4C, after at least one piece of associated information 405 of the subject object 401 is displayed in the human-computer interaction interface, a first bounding box 406 and a second bounding box 407 are displayed in the human-computer interaction interface.

When the scaled size of the subject object in the captured image is less than or equal to the first size threshold and the center of the imaging position of the subject object with the scaled size is located in the central region of the human-computer interaction interface (that is, the subject object with a changed size is within the first bounding box), it indicates that the user does not want to identify the subject object, but wants to identify other nearby objects, a new subject object is re-identified from at least one object included in the captured image, and at least one piece of associated information of the new subject object is displayed in the human-computer interaction interface.

It is to be explained that, according to this embodiment of this disclosure, when the scaled size of the subject object in the captured image is less than or equal to the first size threshold, a new subject object is re-identified from at least one object included in the captured image, and at least one piece of associated information of the new subject object is displayed in the human-computer interaction interface.

For example, the user adjusts the camera of the terminal to move along an X axis and a Y axis, when it is identified that the area of the subject object is less than or equal to 10% of the screen area, it means that the user does not want to identify the subject object but wants to identify other nearby objects, and at this time, the subject object in the captured image is re-determined.

In some embodiments, the updating and displaying at least one piece of associated information of the subject object based on the subject object with a changed size in response to a change in the size of the subject object in the captured image comprises: updating and displaying at least one piece of associated information of the subject object based on the subject object with a changed size in response to a change in the size of the subject object in the captured image and the fact that the size of the subject object remains unchanged for a preset time period.

For example, through the condition that the size of the subject object remains unchanged within a preset time period, an error caused by hands tremble of the user is avoided, so that the user intention is accurately identified, to update and display at least one piece of associated information of the subject object.

In some embodiments, the display mode of the human-computer interaction interface includes a landscape display mode and a portrait display mode; when at least one piece of associated information of the subject object is displayed in the human-computer interaction interface in a first display mode, the human-computer interaction interface in the first display mode is switched to the human-computer interaction interface in a second display mode in response to a switching operation for the first display mode, and the subject object is displayed in the central region of the human-computer interaction interface in the second display mode, and at least one piece of associated information is displayed at a position not overlapping the subject object in the human-computer interaction interface, where the first display mode is any one of the landscape display mode and the portrait display mode, and the second display mode is the other one of the landscape display mode and the portrait display mode.

Figure 15:
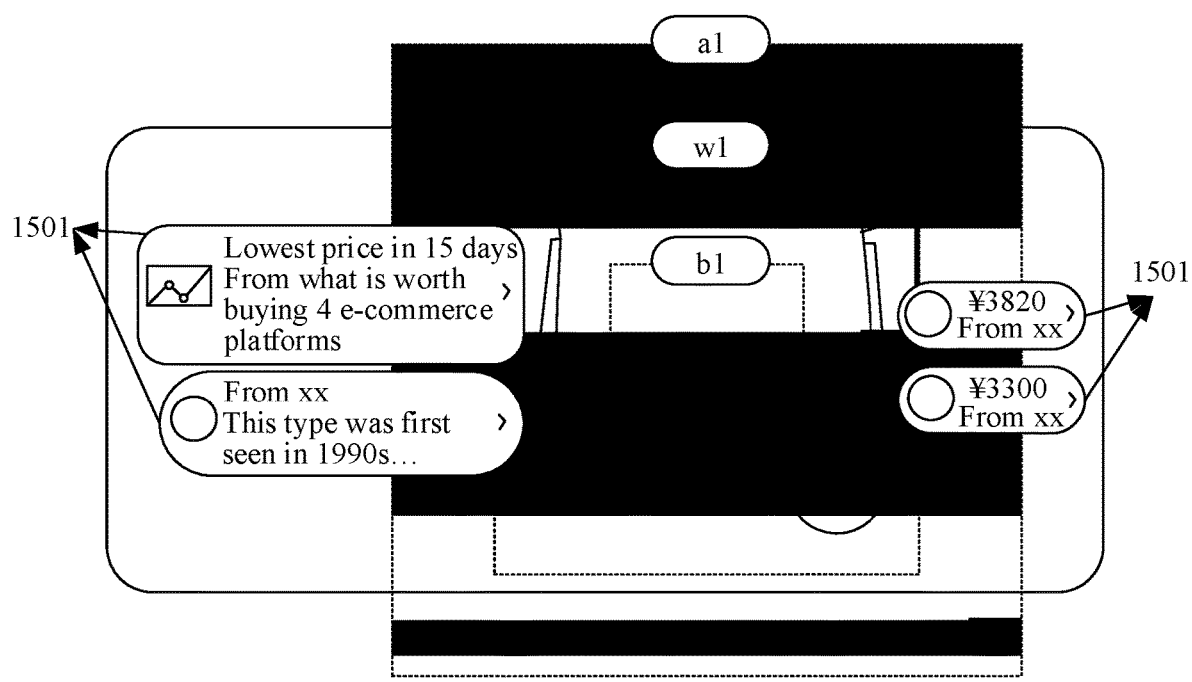
FIG. 15 is a schematic diagram of portrait and landscape mode switching according to an embodiment of this disclosure.

As shown in FIG. 15, when the terminal is switched from the portrait mode to the landscape mode, the cards 1501 are rearranged on a left side and a right side of the subject object 1101. It is to be explained that, the switching operation may be directly switching between the landscape mode and the portrait mode of the terminal manually, or displaying a landscape and portrait switching button on the human-computer interaction interface and triggering the landscape and portrait switching button to implement landscape and portrait switching.

In some embodiments, the displaying at least one piece of associated information of the subject object in the human-computer interaction interface comprises: determining a background corresponding to the at least one piece of associated information in a captured image; and displaying the at least one piece of associated information in a display style different from the background in the human-computer interaction interface, where parameters of the display style include at least one of the following: a color, a shape and an output format.

For example, the associated information is displayed through a virtual card, the color of the background of the associated information is determined, and the color of the virtual card above is intelligently adjusted through the color of the background, so that the color contrast between the virtual card and the background is greater than 1.7 times, thereby ensuring clear display of the associated information.

In some embodiments, before at least one piece of associated information of the subject object is displayed in the human-computer interaction interface, feature extraction processing is performed on the subject object in the human-computer interaction interface to obtain object features of the subject object; candidate associated information of the subject object is determined based on the object features of the subject object; and based on historical behavior data corresponding to an account of the human-computer interaction interface, the candidate associated information of the subject object is screened to obtain at least one piece of associated information of the subject object.

For example, after the subject object is identified, features such as a shape, a texture, a color and a text of the subject object are extracted to obtain object features (for example, a text features and a texture feature) of the subject object; the object features of the subject object are inputted to a search engine to obtain candidate associated information (for example, search information) of the subject object; in combination with the historical behavior data corresponding to the account of the human-computer interaction interface (for example, creators the user once followed or articles that have been viewed), descending sorting based on a matching degree is performed on the candidate associated information of the subject object; and some of the candidate associated information ranked at the top is selected as associated information, and displayed in the form of virtual cards sequentially according to a set priority of a display region.

The matching degree represents the similarity between the candidate associated information of the subject object and the historical behavior data corresponding to the account of the human-computer interaction interface, that is, the higher the similarity between the candidate associated information of the subject object and the historical behavior data corresponding to the account of the human-computer interaction interface is, the higher the matching degree between the candidate associated information of the subject object and the historical behavior data corresponding to the account of the human-computer interaction interface is. This embodiment of this disclosure is not limited to a calculation method of similarity, for example, it may be a cosine similarity calculation method, a Euclidean distance calculation method or the like.

Figure 5A:
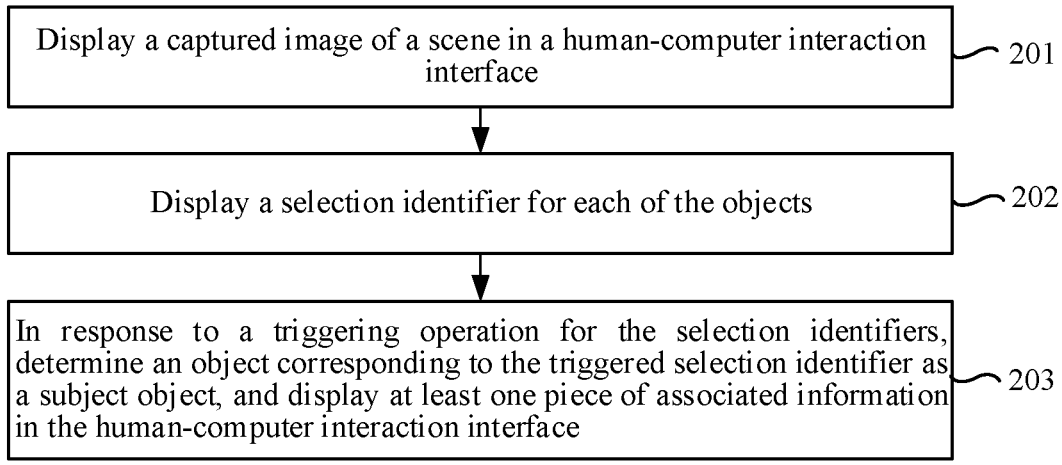
FIG. 5A and FIG. 5B are flowcharts of data processing methods based on augmented reality according to an embodiment of this disclosure.

As mentioned above, the data processing method based on augmented reality provided in the embodiments of this disclosure may be implemented by various types of electronic devices. With reference to FIG. 5A, FIG. 5A is a flowchart of a data processing method based on augmented reality according to an embodiment of this disclosure, and description is made in combination with steps shown in FIG. 5A.

It is to be explained that, the method shown in FIG. 5A may be executed by various forms of computer programs run by the terminal 400, and is not limited to the above-mentioned client 410, for example, the above-mentioned operating system 451, software modules, scripts and applets. Therefore, the following example of the client is not regarded as the limitation of this embodiment of this disclosure.

In step 201, display a captured image of a shot scene in a human-computer interaction interface, the captured image comprising a plurality of objects.

For example, indoor and outdoor environments are shot by the camera of the terminal, so as to display captured images of a shot video in the human-computer interaction interface, the captured images being an image stream that is dynamically updated in a shooting process. As shown in FIG. 9, the captured image includes at least one object, namely, an object 901 and an object 902.

In step 202, display a selection identifier for each object.

For example, as shown in FIG. 9, clickable buttons 903 (i.e., selection identifiers) are displayed on the object 901 and the object 902, for the user to select the subject object from a plurality of objects.

It is to be explained that, when the captured image includes a plurality of objects, this embodiment of this disclosure may also display prompt information in the human-computer interaction interface, the prompt information is used for prompting the selection of the subject object from a plurality of objects, and the prompt information may be text information, or may be image information, voice information, video information, or the like, or may also be displayed through bubbles, blocks, or the like.

In step 203, take an object corresponding to a triggered selection identifier as subject object in response to a triggering operation for the selection identifiers, and display at least one piece of associated information of the subject object in the human-computer interaction interface.

For example, the associated information is any information related to the subject object, for example, search information for the subject object, recommendation information (e.g., advertisements) for the subject object, the associated information of the subject object possibly being text information, or image information, voice information, video information and the like. As shown in FIG. 4A, at least one piece of associated information 405 of the subject object 401 is displayed in the human-computer interaction interface. It is to be explained that, according to this embodiment of this disclosure, partial information of one piece of associated information may be displayed through a virtual card, and all information of the associated information may be viewed by clicking the virtual card.

Figure 5B:
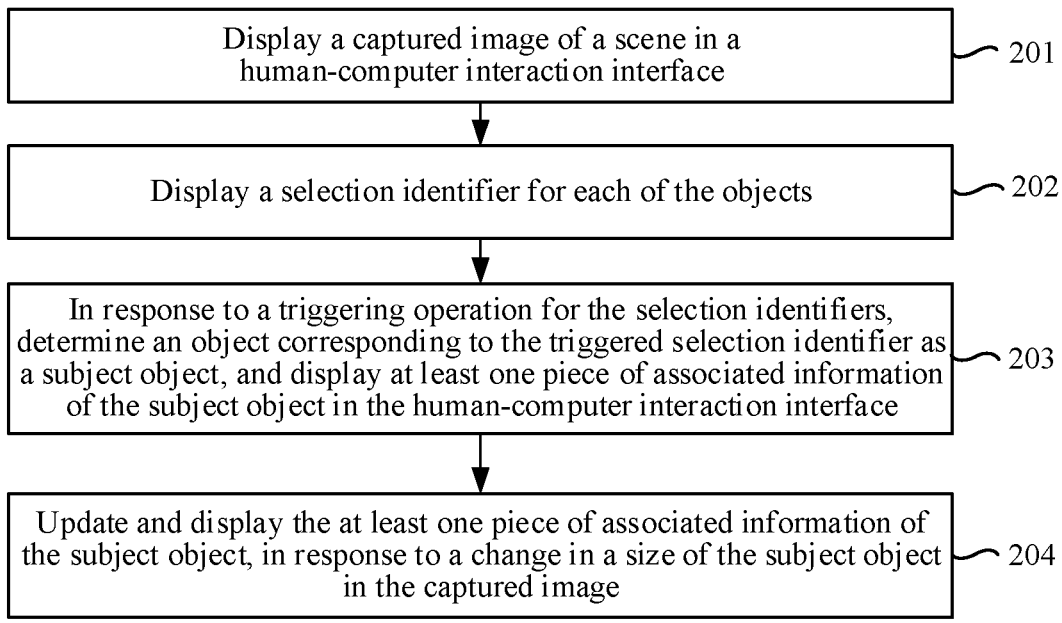

With reference to FIG. 5B, FIG. 5B is one exemplary flowchart of a data processing method based on augmented reality according to an embodiment of this disclosure, and FIG. 5B shows that FIG. 5A further includes step 204. In step 204, update and display at least one piece of associated information of the subject object based on the subject object with a changed size in response to a change in the size of the subject object in the captured image.

For example, if the user adjusts a distance between the camera of the terminal and the subject object, it means that an intention of the user changes and the size of the subject object in the captured image changes, so that the at least one piece of associated information of the subject object is updated and displayed according to the changed size of the subject object, and the associated information is updated based on a real intention of the user, thereby improving the display effect of augmented reality and the accuracy of the associated information.

It is to be explained that, a processing procedure of step 204 in FIG. 5B is similar to that of step 104 in FIG. 3B.

Next, an exemplary application of this embodiment of this disclosure in an actual application scene is described.

This embodiment of this disclosure may be applied to various augmented reality application scenes, such as a search scene and a recommendation scene. For the search scene, objects such as an articles and a plane in a current shooting environment are identified by an object identification technology, and the search information of the subject is superimposed on the identified subject (i.e., the subject object), the search information being the information related to the subject searched from the search engine.

Next, description is made by taking a search scene as an example.

Figure 5C:
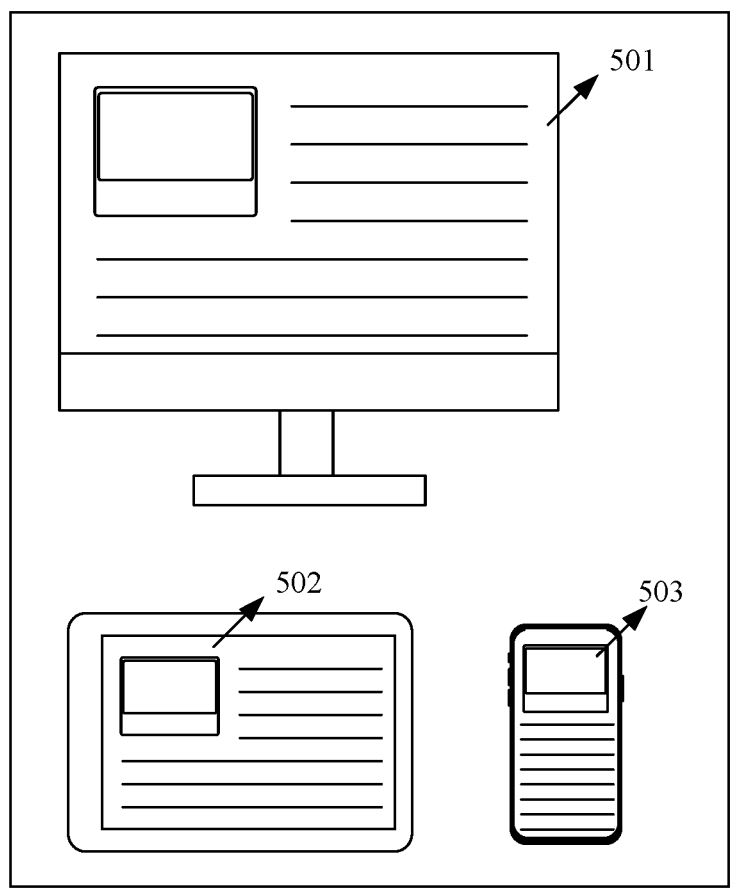
FIG. 5C is a schematic diagram of the display of screens with different sizes according to the related art.

In the related art, screen sizes of different electronic devices are different, and a length and a width of the screen are abstracted into two types: loose and compact, so that different sizes are combined. Developers only need to set the display rules of the corresponding size in a development tool (for example, Xcode), and the operating system automatically adjusts the layout according to the size of the content. As shown in FIG. 5C, a same document is displayed under the display rules of different sizes, and the document is displayed differently in a screen 501, a screen 502 and a screen 503. This type of responsive rules in a screen medium cannot fully understand the interface elements.

An embodiment of this disclosure provides a method for responsive UI presentation according to articles in an AR scene (implemented by a data processing method based on augmented reality). According to the method, a background depth of the image and an outline of a subject object may be judged based on image identification in an AR mode, and then the interface elements are displayed. For example, when the user sees one object (such as a book on a bookshelf) and opens a AR mode of a browser, the server judges the subject according to the content shot by the current camera, determines the outline of the subject, and displays the card in a non-subject region (i.e., the region outside the subject object), where the card (i.e., the virtual card) is subjected to intelligent style processing according to the color depth of the image behind the card. This embodiment of this disclosure can help the user better understand and operate the interface elements in the AR mode.

It is to be explained that, interface design in the AR mode is different from an original pure screen in that the interface design in the AR mode is more complicated; the reasons are as follows: firstly, original interface design elements are all from a designer, while a subject of the interface in the AR mode is from an object shot by the user in real time, and secondly, the background of the original interface design is self-defined by the designer, such as a dark color and a light color, so that other design elements are defined at the beginning, but the background is unpredictable during AR real shooting.

Figure 6:
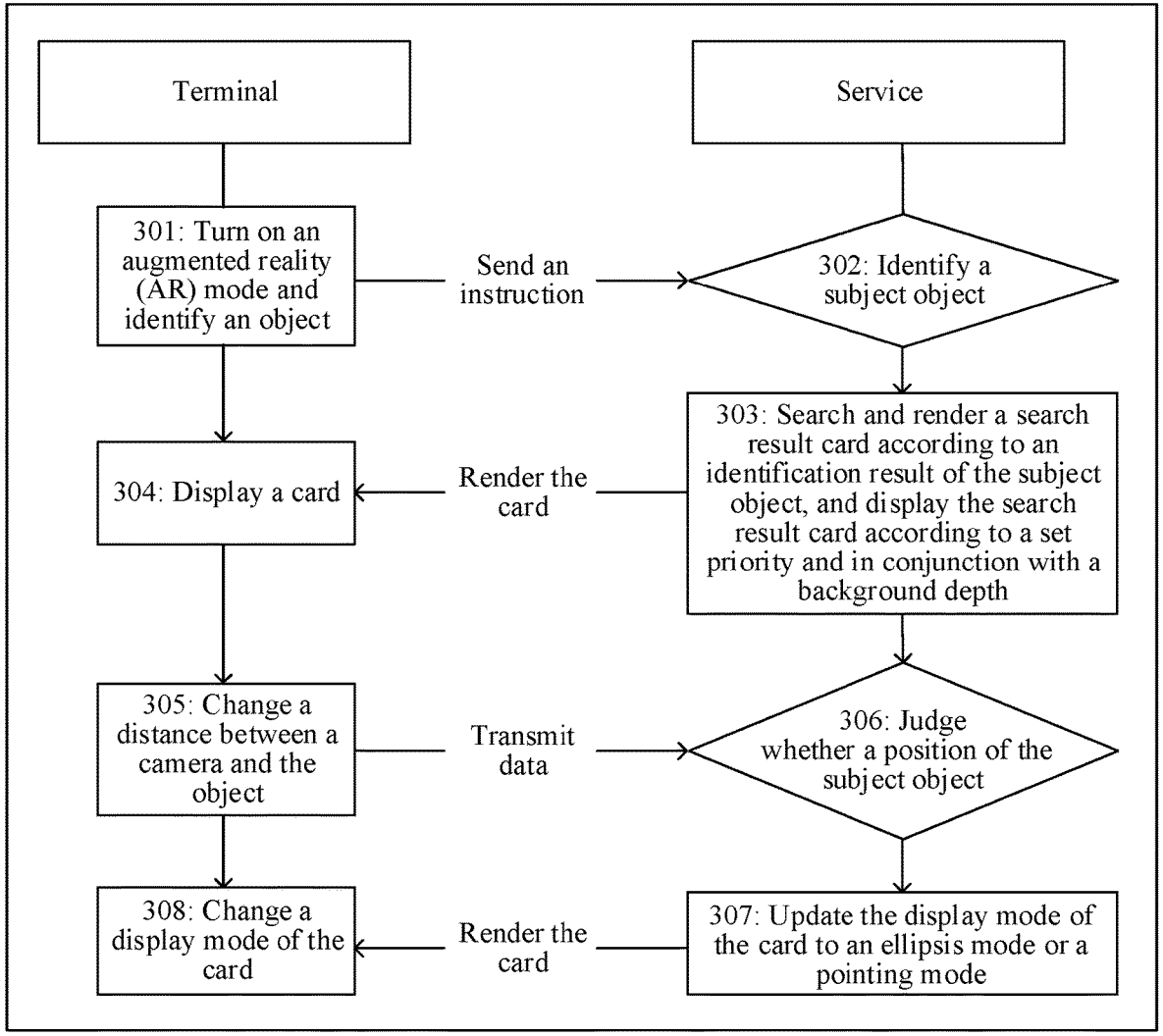
FIG. 6 is a flowchart of a data processing method based on augmented reality according to an embodiment of this disclosure.

Next, the method for responsive UI presentation according to the articles in the AR scene provided in the embodiments of this disclosure is described in conjunction with FIG. 6.

Step 301: A terminal turns on a camera and turns on an AR mode to identify an object in an image, and sends an identification instruction (including the image) to a server.

Step 302: The server identifies a subject object.

For example, the image is obtained through the camera of the terminal, and the image is processed as follows: the image is denoised by the median blur algorithm, while the contrast of the image is improved to clearly show edge details. After median blur, the gradient and the direction of each pixel point in the image are calculated by using a Canny algorithm, whether the pixel point is a point on an edge is judged, the identified points on the edge are set as a data set $\{x1\}$, and an area and a position of the data set $\{x1\}$ are calculated, so as to identify the object in the image, as shown in FIG. 7, the object 701 being identified by the method above.

If there are a plurality of objects in the image, all the objects are identified sequentially by the method above, and when an area difference between the identified object with a largest area (size) and the object with a second largest area is greater than 10% of the screen area, the object with the largest area is determined as the subject object in the image, and card recommendation is performed for the subject object. As shown in FIG. 8, the object 801 and the object 802 are identified by the method above, and since an area difference between the object 801 and the object 802 is greater than 10% of the screen area, the object 801 is determined as the subject object in the image.

When the area difference between the identified object with the largest area and the object with the second largest area is less than or equal to 10% of the screen area, it is determined that the image has a plurality of candidate subject objects, and the pointing modes are displayed on these candidate subject objects, that is, clickable buttons are displayed on the candidate subject objects, to indicate that the objects are clickable, so as to determine the subject object from the plurality of candidate subject objects, thereby selecting one subject object from the plurality of objects through user selection, and performing card recommendation for the subject object. As shown in FIG. 9, the object 901 and the object 902 are identified by the method above, and since an area difference between the object 901 and the object 902 is less than or equal to 10% of the screen area, clickable buttons 903 are displayed on the object 901 and the object 902.

It is to be explained that, when there are a plurality of objects in the image and there is a masked relationship between the objects, only the unmasked area of each object is calculated to judge whether the area difference between the object with the largest area and the object with the second largest area is greater than 10% of the screen area. As shown in FIG. 10, the object 1001 and the object 1002 are identified by the method above, and since the area (unmasked area) difference between the object 1001 and the object 1002 is greater than 10% of the screen area, the object 1001 is determined as the subject object in the image.

Step 303: The server searches for and renders a search result card according to the identification result of the subject object, displays the search result card according to a set priority and in conjunction with a background depth, and sends the card to the terminal.

For example, after the subject object is identified, features such as a shape, a texture and a color of the subject object are extracted to obtain a shape feature, a texture feature and a color feature of the subject object; and when the subject object in the image has characters, the characters in the image may be preprocessed (such as segmentation, size normalization and stroke width normalization), and then is subjected to character identification based on an enhancement algorithm to obtain a character feature of the subject object. The extracted features of the subject object (for example, the text feature and the texture feature) are inputted into the search engine, and descending sorting is performed on the search information of the subject object in combination with the user's behavior data (such as the creators the user once followed or articles that have been viewed), the first 1-5 pieces of search information are selected, and the search information of the subject object is displayed in the form of AR cards (virtual cards) according to a set priority of a display region. Meanwhile, it is judged whether the card information is clearly displayed, that is, the font size of the search information in the card is at least 12 px, and the color contrast between the card and the background is greater than 1.7 times, then it indicates that the card information is clearly displayed, otherwise, the card color is intelligently adjusted to allow the color contrast between the card and the background to be greater than 1.7 times.

Step 304: The terminal displays the card.

Step 305: The user changes the distance between the camera and the object through the camera of the mobile terminal, and sends mobile data to the server.

Step 306: The server judges whether a position of the subject object matches a set security region.

For example, if the user adjusts the distance between the camera of the terminal and the subject object, it means that the intention of the user changes. When the subject object matches an outline of a security region w1 best (that is, the subject object is within the security region w1 (corresponding to the second bounding box) and beyond a region b1 (corresponding to the first bounding box)), the card automatically zooms with the subject object to ensure a clear understanding of the document; when the subject object matches an outline of a region a1 best (that is, the subject object is beyond the security region w1), it indicates that the user zooms in the camera and wants to see details of the subject object, and the previously recommended card is inaccurate, so that it is necessary to update the display mode of the card to the ellipsis mode (for briefly describing the object), and meanwhile, more cards in the ellipsis mode can be displayed according to the occupation of the area; and when the subject object matches an outline of the region b1 best (that is, the subject object is within the region b1), it means that the user does not want to identify the subject object, but wants to identify other nearby objects, and at this time, it is very likely to re-determine that there are a plurality of candidate subject objects in the image according to step 2, then the card is changed to the pointing mode and points to the plurality of different candidate subject objects respectively, and the steps above are repeated.

Figure 11:
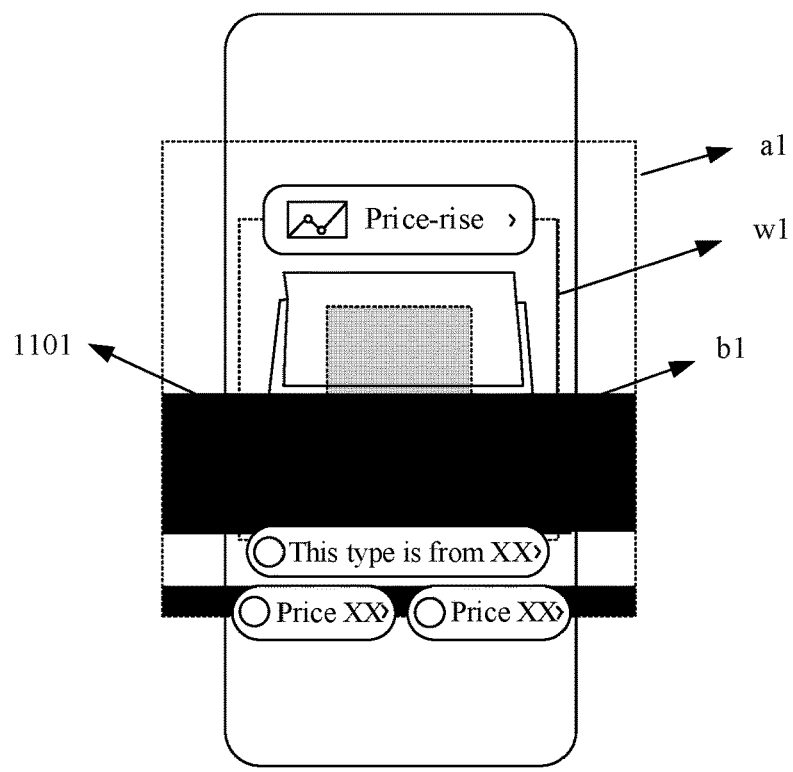
FIG. 11 to FIG. 13 are schematic diagrams of position matching of subject objects according to embodiments of this disclosure.

As shown in FIG. 11, if the user adjusts the distance between the camera of the terminal and the subject object 1101, when the subject object 1101 is within the security region w1 and beyond the region b 1, the card automatically zooms with the subject object 1101 to ensure a clear understanding of the document.

Figure 12:
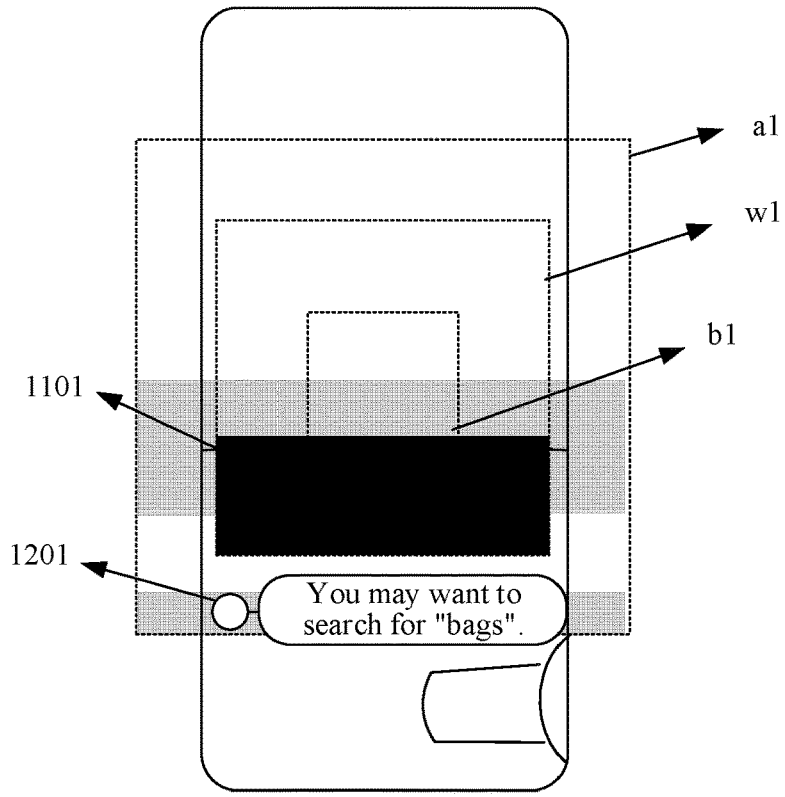

As shown in FIG. 12, if the user adjusts the distance between the camera of the terminal and the subject object 1101, when the subject object 1101 is within the region al and beyond the region w1, it means that the user zooms in the camera and wants to see details of the subject object 1101, and the previously recommended card is inaccurate, so that it is necessary to update the display mode of the card to the ellipsis mode 1201 (for briefly describing the object).

Figure 13:
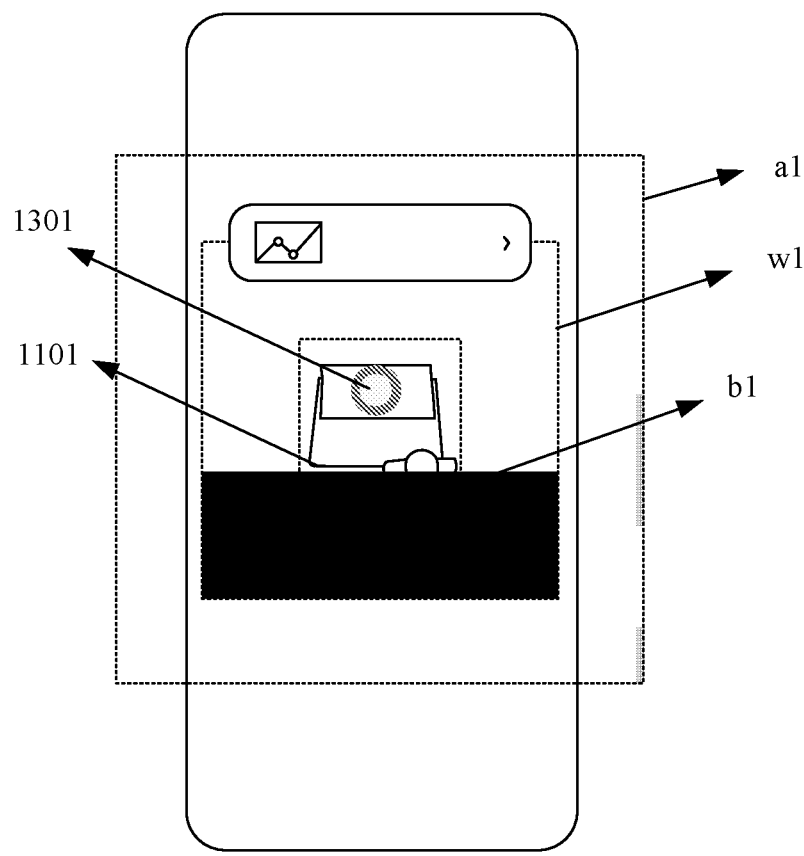

As shown in FIG. 13, if the user adjusts the distance between the camera of the terminal and the subject object 1101, when the subject object 1101 is within the region b1, it means that the user does not want to identify the subject object, but wants to identify other nearby objects, and at this time, it is very likely to re-determine that there are a plurality of candidate subject objects in the image according to step 2, then the card is changed to the pointing mode 1301 and points to the plurality of different candidate subject objects respectively.

Figure 14:
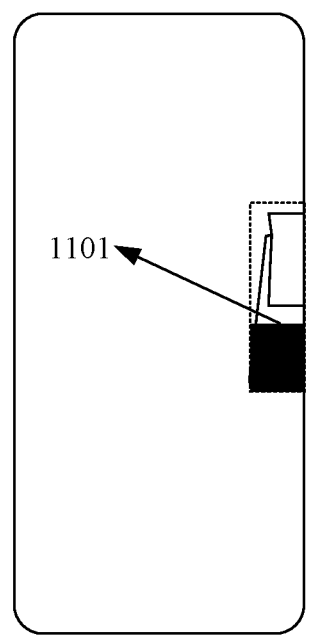
FIG. 14 is a schematic diagram of area matching of a subject object according to an embodiment of this disclosure.

As shown in FIG. 14, if the user adjusts the camera of the terminal to move along the X-axis and Y-axis, when it is identified that the area of the subject object 1101 is less than or equal to 10% of the screen area, it means that the user does not want to identify the subject object, but wants to identify other nearby objects, and at this time, it is very likely to re-determine that there are a plurality of candidate subject objects in the image according to step 2, then the card is changed to the pointing mode and points to the plurality of different candidate subject objects respectively.

As shown in FIG. 15, if the user switches the landscape mode and the portrait mode of the terminal, when switching the terminal from the portrait mode to the landscape mode, the card information 1501 is rearranged on the left side and the right side of the subject object 1101.

Step 307: When the position of the subject object does not match the set security region, update the display mode of the card to the ellipsis mode or the pointing mode, and send the updated card.

Step 308: The terminal updates the display mode of the card.

To sum up, the data processing method based on augmented reality provided in the embodiments of this disclosure can intelligently judge the subject object in the current picture, intelligently adjust the virtual card in combination with a background tone, judge the user intention in combination with the change in distance between the camera and the subject object, and then update and display the virtual card, so as to improve the operation and reading efficiency of the user and improve the user experience.

So far, the data processing method based on augmented reality provided in the embodiments of this disclosure has been described in combination with the exemplary application and the implementation of the terminal provided in the embodiments of this disclosure. Next, a solution that various module in the data processing apparatus based on augmented reality 455 provided in the embodiments of this disclosure cooperate to implement data processing based on augmented reality is described.

A first display module 4551, being configured to display a captured image of a shot scene in a human-computer interaction interface, the captured image comprising at least one object; and an identification module 4552, being configured to identify a subject object from the at least one object, the subject object being an only object or an object with a largest size in the captured image; the first display module 4551 being further configured to display at least one piece of associated information of the subject object in the human-computer interaction interface.

In some embodiments, when the captured image comprises a plurality of objects, the identification module 4552 is further configured to determine a first object with a largest size and a second object with a size second only to the first object among the plurality of objects; and determine the first object as the subject object when a size difference between the first object and the second object is greater than a size difference threshold, where the size difference threshold is the product of an area of the human-computer interaction interface and a preset proportion.

In some embodiments, types of the sizes of the objects include one of the following: an imaging size and an actual size, where the imaging size represents a size of an unmasked portion of the object in the human-computer interaction interface, and the actual size represents a sum of the size of the unmasked portion and a size of a masked portion of the object in the human-computer interaction interface.

In some embodiments, the identification module 4552 is further configured to determine the first object as the subject object when the size difference between the first object and the second object is greater than the size difference threshold and the first object is located in a central region of the human-computer interaction interface.

In some embodiments, the identification module 4552 is further configured to perform descending sorting processing on the objects, except the first object, among the plurality of objects based on the sizes of the plurality of objects, when the size difference between the first object and the second object is greater than the size difference threshold and a center of an imaging position of the first object is not located in the central region of the human-computer interaction interface; and take an object being the first to meet the following conditions in a descending sorting result as the subject object: the size difference between the object and the object with the size second only to the object is greater than the size difference threshold; and the center of the imaging position of the object is located in the central region of the human-computer interaction interface.

In some embodiments, the identification module 4552 is further configured to determine a salience of each object based on the size and the imaging position of each object, when the size difference between the first object and the second object is greater than the size difference threshold and the first object is not located in the central region of the human-computer interaction interface; and determine an object with a highest salience as the subject object.

In some embodiments, when the captured image comprises a plurality of objects, before the displaying at least one piece of associated information of the subject object in the human-computer interaction interface, the identification module 4552 is further configured to perform descending sorting processing on the plurality of objects based on the sizes of the plurality of objects; when the size difference between any two adjacent objects in the descending sorting result is less than or equal to the size difference threshold, display selection identifiers for the any two adjacent objects, where the size difference threshold is the product of the area of the human-computer interaction interface and the preset proportion; and determine an object corresponding to a triggered selection identifier as the subject object in response to a triggering operation for the selection identifiers.

In some embodiments, when the captured image comprises a plurality of objects, before the displaying at least one piece of associated information of the subject object in the human-computer interaction interface, the identification module 4552 is further configured to perform descending sorting processing on the plurality of objects based on the sizes of the plurality of objects; when the size difference between any two adjacent objects in the descending sorting result is less than or equal to the size difference threshold, call an object preference model based on the plurality of objects to perform object preference prediction, to obtain the subject object among the plurality of objects, where the size difference threshold is the product of the area of the human-computer interaction interface and the preset proportion, and the object preference model is obtained by training annotated data of a plurality of historical objects and a historical subject object comprised in a historical image.

In some embodiments, the first display module 4551 is further configured to update and display at least one piece of associated information of the subject object in response to a change in the size of the subject object in the captured image.

In some embodiments, the first display module 4551 is further configured to display at least one virtual card of the subject object in the human-computer interaction interface, each virtual card comprising one piece of the associated information; and synchronously scale a size of the virtual card based on a scaling ratio of the size of the subject object.

In some embodiments, before the synchronously scaling a size of the virtual card, the first display module 4551 is further configured to determine that an operation of synchronously scaling the size of the virtual card is to be executed when the scaled size of the subject object in the captured image is greater than a first size threshold and less than a second size threshold and a center of an imaging position of the subject object is located in a central region of the human-computer interaction interface where the first size threshold is less than the second size threshold.

In some embodiments, the first display module 4551 is further configured to: when the scaled size of the subject object in the captured image is greater than or equal to the second size threshold and the center of the imaging position of the subject object with the scaled size is located in a preset region of the human-computer interaction interface, reduce contents of the associated information displayed in the virtual card, and display a new virtual card of the subject object in the human-computer interaction interface, each new virtual card comprising one piece of associated information of the subject object.

In some embodiments, the first display module 4551 is further configured to: when the scaled size of the subject object in the captured image is less than or equal to the first size threshold and the center of the imaging position of the subject object with the scaled size is located in the central region of the human-computer interaction interface, re-identify a new subject object from at least one object comprised in the captured image, and display at least one piece of associated information of the new subject object in the human-computer interaction interface.

In some embodiments, the first display module 4551 is further configured to update and display at least one piece of associated information of the subject object based on the subject object with a changed size in response to a change in the size of the subject object in the captured image and the fact that the size of the subject object remains unchanged for a preset time period.

In some embodiments, a display mode of the human-computer interaction interface comprises a landscape display mode and a portrait display mode; the first display module 4551 is further configured to: during the displaying at least one piece of associated information of the subject object in the human-computer interaction interface in a first display mode, switch the human-computer interaction interface in the first display mode to the human-computer interaction interface in a second display mode in response to a switching operation for the first display mode, display the subject object in the central region of the human-computer interaction interface in the second display mode, and display the at least one piece of associated information at a position avoiding the subject object in the human-computer interaction interface, where the first display mode is any one of the landscape display mode and the portrait display mode, and the second display mode is the other one of the landscape display mode and the portrait display mode.

In some embodiments, the first display module 4551 is further configured to determine a background corresponding to the at least one piece of associated information in the captured image; and display the at least one piece of associated information in a display style different from the background in the human-computer interaction interface, where parameters of the display styles comprise at least one of the following: a color, a shape and an output format.

In some embodiments, after the displaying a captured image of a shot scene in a human-computer interaction interface, the first display module 4551 is further configured to denoise the captured image to obtain the denoised captured image; and perform edge detection processing on the denoised captured image to obtain an identification result of the at least one object in the captured image.

In some embodiments, before the displaying at least one piece of associated information of the subject object in the human-computer interaction interface, the first display module 4551 is further configured to perform feature extraction processing on the subject object in the human-computer interaction interface to obtain object features of the subject object; determine candidate associated information of the subject object based on the object features of the subject object; and based on historical behavior data corresponding to an account of the human-computer interaction interface, screen the candidate associated information of the subject object to obtain at least one piece of associated information of the subject object.

The second display module 4553 being configured to: display a captured image of a shot scene in the human-computer interaction interface, the captured image comprising a plurality of objects; and display a selection identifier for each object; and the trigger module 4554 being configured to: take an object corresponding to a triggered selection identifier as a subject object in response to a triggering operation for the selection identifiers, and display at least one piece of associated information of the subject object in the human-computer interaction interface.

In some embodiments, the trigger module 4554 is further configured to update and display at least one piece of associated information of the subject object based on the subject object with a changed size in response to a change in the size of the subject object in the captured image.

An embodiment of this disclosure provides a computer program product or a computer program, the computer program product or the computer program including computer instructions stored in a computer-readable storage medium. A processor of the electronic device reads the computer instruction from the computer-readable storage medium, and the processor executes the computer instruction, so that the electronic device executes the data processing method based on augmented reality described in the embodiments of this disclosure.

An embodiment of this disclosure provides a computer-readable storage medium storing executable instructions, the executable instructions, when executed by a processor, causing the processor to execute the data processing method based on augmented reality provided in the embodiments of this disclosure, for example, the data processing methods based on augmented reality as shown in FIG. 3A, FIG. 3B, FIG. 5A and FIG. 5B.

In some embodiments, the computer-readable storage medium may be a memory such as FRAM, ROM, PROM, EPROM, EEPROM, a flash memory, a magnetic surface memory, an optical disk, a CD-ROM or the like, and may also be various devices including one or any combination of the memories above.

In some embodiments, executable instructions may be in the form of a program, a software module, a script, or a code written in any form of programming languages, including compiled or interpreted languages, or declarative or procedural languages, and it may be deployed in any form, including as a stand-alone program or as a module, a component, a subroutine, or other unit suitable for use in a computing environment.

As an example, executable instructions may, but do not necessarily, correspond to a file in a file system, and may be stored in a part of the file for saving other programs or data, for example, in one or more scripts in a HyperText Markup Language (HTML) document, in a single file specifically used for the program discussed, or in a plurality of collaborative files (for example, files storing one or more modules, a subprogram, or a code part).

As an example, executable instructions may be deployed to be executed on one computing device, or on a plurality of computing devices located in one location, or on a plurality of computing devices distributed in a plurality of locations and interconnected through a communication network.

It may be understood that in the embodiments of this disclosure, user data such as historical behavior data are involved, and when the embodiments of this disclosure is applied to specific products or technologies, a user's permission or consent is obtained, and the collection, use and processing of relevant data comply with relevant laws, regulations and standards of relevant countries and regions.

The above are only embodiments of this disclosure, and are not intended to limit the protection scope of this disclosure. Any modifications, equivalent substitutions and improvements made within the spirit and scope of this disclosure are included in the protection scope of this disclosure.

What is claimed is:
1. A data processing method based on augmented reality, and comprising:
displaying a captured image of a scene in a human-computer interaction interface, the captured image comprising a plurality of objects;

determining a first object with a largest size and a second object with a size second only to the first object among the plurality of objects;

in response to a size difference between the first object and the second object being greater than a size difference threshold and a center of an imaging position of the first object being not located in a central region of the human-computer interaction interface, identifying a subject object from the plurality of objects other than the first object, and displaying at least one piece of information associated with the subject object in the human-computer interaction interface.

2. The method according to claim 1, wherein the method comprises:

determining the first object as the subject object in response to a size difference between the first object and the second object being greater than the size difference threshold, the size difference threshold being a product of an area of the human-computer interaction interface and a preset proportion.

3. The method according to claim 2, wherein a size of an object is an imaging size or an actual size, the imaging size represents a size of an unmasked portion of the object in the human-computer interaction interface, and the actual size represents a sum of the size of the unmasked portion and a size of a masked portion of the object in the human-computer interaction interface.

4. The method according to claim 2, wherein the determining the first object as the subject object comprises:

determining the first object as the subject object in response to the size difference between the first object and the second object being greater than the size difference threshold and the first object being located in a central region of the human-computer interaction interface.

5. The method according to claim 1, wherein the identifying the subject object from the plurality of objects other than the first object comprises method further comprises:

sorting the objects other than the first object in descending order by the sizes of the objects; and determining an object being a first to meet following conditions in the sorting result as the subject object:

the size difference between the object and the object with the size second only to the object being greater than the size difference threshold, and the center of the imaging position of the object being located in the central region of the human-computer interaction interface.

6. The method according to claim 4, wherein the method further comprises:

determining a salience of each of the objects based on the size and the imaging position of the each object in response to the size difference between the first object and the second object being greater than the size difference threshold and the first object being not located in the central region of the human-computer interaction interface; and determining an object with a highest salience as the subject object.

7. The method according to claim 1, wherein the captured image comprises a plurality of objects, the method further comprises:

sorting the plurality of objects in descending order by sizes of the plurality of objects;

in response to a size difference between two adjacent objects in the sorting result being less than or equal to a size difference threshold, displaying selection identifiers for the two adjacent objects, the size difference threshold being a product of an area of the human-computer interaction interface and a preset proportion; and determining an object corresponding to a triggered selection identifier as the subject object in response to a triggering operation for the selection identifiers.

8. The method according to claim 1, wherein the captured image comprises a plurality of objects, the method further comprises:

sorting the plurality of objects in descending order by sizes of the plurality of objects; and in response to a size difference between two adjacent objects in the sorting result being less than or equal to a size difference threshold, executing an object preference model based on the plurality of objects to perform object preference prediction, to obtain the subject object from the plurality of objects, the size difference threshold being a product of an area of the human-computer interaction interface and a preset proportion, and the object preference model being obtained by training annotated data of a plurality of historical objects and a historical subject object comprised in a historical image.

9. The method according to claim 1, wherein the method further comprises:

updating and displaying at least one piece of information associated with the subject object in response to a change in a size of the subject object in the captured image.

10. The method according to claim 9, wherein the displaying the at least one piece of information associated with the subject object in the human-computer interaction interface comprises:

displaying at least one virtual card of the subject object in the human-computer interaction interface, the virtual card comprising one piece of the information associated with the subject object; and the updating and displaying the at least one piece of information associated with the subject object comprises:

synchronously scaling a size of the virtual card based on a scaling ratio of the size of the subject object.

11. The method according to claim 10, wherein the method further comprises:

determining to execute an operation of synchronously scaling the size of the virtual card, in response to the scaled size of the subject object in the captured image being greater than a first size threshold and less than a second size threshold, and a center of an imaging position of the subject object being located in a central region of the human-computer interaction interface, the first size threshold being less than the second size threshold.

12. The method according to claim 10, wherein the method further comprises:

in response to the scaled size of the subject object in the captured image being greater than or equal to a second size threshold and the center of the imaging position of the subject object with the scaled size being located in a preset region of the human-computer interaction interface, reducing contents of the associated information displayed in the virtual card, and displaying a new virtual card of the subject object in the human-computer interaction interface, the new virtual card comprising one piece of information associated with the subject object.

13. The method according to claim 10, wherein the method further comprises:
in response to the scaled size of the subject object in the captured image being less than or equal to a first size threshold and the center of the imaging position of the subject object with the scaled size being located in a central region of the human-computer interaction interface,
re-identifying a new subject object from the a plurality of objects comprised in the captured image, and
displaying at least one piece of information associated with the new subject object in the human-computer interaction interface.

14. The method according to claim 9, wherein the updating and displaying the at least one piece of associated information of the subject object comprises:
updating and displaying the at least one piece of associated information of the subject object in response to the change in the size of the subject object in the captured image and the size of the subject object staying unchanged for a preset time period.

15. The method according to claim 1, wherein a display mode of the human-computer interaction interface comprises a landscape display mode and a portrait display mode, and the method further comprises:
in response to a switching operation from a first display mode to a second display mode,
switching the human-computer interaction interface in the first display mode to the human-computer interaction interface in a second display mode,
displaying the subject object in a central region of the human-computer interaction interface in the second display mode, and
displaying the at least one piece of associated information at a position not overlapping the subject object in the human-computer interaction interface.

16. The method according to claim 1, wherein the displaying the at least one piece of information associated with the subject object in the human-computer interaction interface comprises:
determining a background corresponding to the at least one piece of associated information in the captured image; and
displaying the at least one piece of associated information in a display style different from the background in the human-computer interaction interface, the display style comprising at least one of a color, a shape, or an output format.

17. The method according to claim 1, wherein the method further comprises:
denoising the captured image to obtain the denoised captured image; and
performing edge detection processing on the denoised captured image to obtain an identification result of the a plurality of objects in the captured image.

18. The method according to claim 1, wherein, the method further comprises:
performing feature extraction processing on the subject object in the human-computer interaction interface to obtain object features of the subject object;
determining candidate information associated with the subject object based on the object features of the subject object; and
screening, based on historical behavior data corresponding to an account of the human-computer interaction interface, the candidate associated information of the subject object to obtain at least one piece of associated information associated with the subject object.

* * * * *